(12) United States Patent
Affinito et al.

(10) Patent No.: US 10,333,149 B2
(45) Date of Patent: Jun. 25, 2019

(54) RELEASE SYSTEM FOR ELECTROCHEMICAL CELLS

(71) Applicant: Sion Power Corporation, Tucson, AZ (US)

(72) Inventors: John D. Affinito, Tucson, AZ (US); John A. Martens, Tucson, AZ (US); Ang Xiao, Tucson, AZ (US); Christopher T. S. Campbell, Tucson, AZ (US); Yuriy V. Mikhaylik, Tucson, AZ (US); Igor P. Kovalev, Vail, AZ (US); Ashley H. Bulldis, Sahuarita, AZ (US); Zhesheng Xu, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 127 days.

(21) Appl. No.: 14/088,750

(22) Filed: Nov. 25, 2013

(65) Prior Publication Data

US 2014/0079994 A1   Mar. 20, 2014

Related U.S. Application Data

(62) Division of application No. 12/862,513, filed on Aug. 24, 2010, now abandoned.

(Continued)

(51) Int. Cl.
*H01M 4/13* (2010.01)
*H01M 4/66* (2006.01)
(Continued)

(52) U.S. Cl.
CPC ......... *H01M 4/667* (2013.01); *H01M 4/0404* (2013.01); *H01M 4/13* (2013.01);
(Continued)

(58) Field of Classification Search
None
See application file for complete search history.

(56) References Cited

U.S. PATENT DOCUMENTS

| 2,155,687 A | 4/1939 | Lee |
| 3,080,350 A | 3/1963 | Kiyokazu et al. |

(Continued)

FOREIGN PATENT DOCUMENTS

| CN | 1577919 A | 2/2005 |
| CN | 1714465 A | 12/2005 |

(Continued)

OTHER PUBLICATIONS

International Search Report dated May 23, 2011 for PCT/US2010/002326.

(Continued)

*Primary Examiner* — Lucas J. O'Donnell
(74) *Attorney, Agent, or Firm* — Wolf, Greenfield & Sacks, P.C.

(57) ABSTRACT

Electrochemical cells, and more specifically, release systems for the fabrication of electrochemical cells are described. In particular, release layer arrangements, assemblies, methods and compositions that facilitate the fabrication of electrochemical cell components, such as electrodes, are presented. In some embodiments, methods of fabricating an electrode involve the use of a release layer to separate portions of the electrode from a carrier substrate on which the electrode was fabricated. For example, an intermediate electrode assembly may include, in sequence, an electroactive material layer, a current collector layer, a release layer, and a carrier substrate. The carrier substrate can facilitate handling of the electrode during fabrication and/or assembly, but may be released from the electrode prior to commercial use.

23 Claims, 2 Drawing Sheets

Related U.S. Application Data

(60) Provisional application No. 61/236,322, filed on Aug. 24, 2009.

(51) Int. Cl.

| | | |
|---|---|---|
| *H01M 4/139* | (2010.01) | |
| *H01M 10/052* | (2010.01) | |
| *H01M 4/04* | (2006.01) | |
| *H01M 4/134* | (2010.01) | |
| *H01M 4/1395* | (2010.01) | |
| *H01M 4/38* | (2006.01) | |
| *B32B 37/12* | (2006.01) | |
| *B32B 37/24* | (2006.01) | |
| *B32B 38/16* | (2006.01) | |

(52) U.S. Cl.
CPC ............ *H01M 4/134* (2013.01); *H01M 4/139* (2013.01); *H01M 4/1395* (2013.01); *H01M 4/382* (2013.01); *H01M 4/662* (2013.01); *H01M 10/052* (2013.01); *B32B 37/12* (2013.01); *B32B 2037/246* (2013.01); *B32B 2038/168* (2013.01); *B32B 2307/748* (2013.01); *B32B 2310/0806* (2013.01); *B32B 2457/10* (2013.01)

(56) References Cited

U.S. PATENT DOCUMENTS

| | | | |
|---|---|---|---|
| 3,277,117 | A | 10/1966 | Bolton et al. |
| 4,440,830 | A * | 4/1984 | Wempe ................ C09D 129/04 428/352 |
| 4,664,991 | A | 5/1987 | Perichaud et al. |
| 4,739,018 | A | 4/1988 | Armand et al. |
| 4,833,048 | A | 5/1989 | DeJonghe et al. |
| 4,917,974 | A | 4/1990 | DeJonghe et al. |
| 4,954,371 | A | 9/1990 | Yializis |
| 5,162,175 | A | 11/1992 | Visco et al. |
| 5,194,341 | A | 3/1993 | Bagley et al. |
| 5,324,599 | A | 6/1994 | Oyama et al. |
| 5,441,831 | A | 8/1995 | Okamoto et al. |
| 5,516,598 | A | 5/1996 | Visco et al. |
| 5,529,860 | A | 6/1996 | Skotheim et al. |
| 5,538,812 | A | 7/1996 | Lee et al. |
| 5,601,947 | A | 2/1997 | Skotheim et al. |
| 5,648,187 | A | 7/1997 | Skotheim |
| 5,681,615 | A | 10/1997 | Affinito et al. |
| 5,682,210 | A | 10/1997 | Weirich |
| 5,690,702 | A | 11/1997 | Skotheim et al. |
| 5,723,230 | A | 3/1998 | Naoi et al. |
| 5,783,330 | A | 7/1998 | Naoi et al. |
| 5,786,092 | A | 7/1998 | Lorenzo et al. |
| 5,792,575 | A | 8/1998 | Naoi et al. |
| 5,882,819 | A | 3/1999 | Naoi et al. |
| 5,919,587 | A | 7/1999 | Mukherjee et al. |
| 5,961,672 | A | 10/1999 | Skotheim et al. |
| 6,010,798 | A | 1/2000 | Hammerschmidt et al. |
| 6,020,412 | A | 2/2000 | Muschelewicz |
| 6,025,094 | A | 2/2000 | Visco et al. |
| 6,117,590 | A | 9/2000 | Skotheim et al. |
| 6,120,930 | A | 9/2000 | Rouillard et al. |
| 6,134,773 | A * | 10/2000 | Kejha ................... H01M 6/188 29/623.1 |
| 6,136,468 | A | 10/2000 | Mitchell, Jr. et al. |
| 6,153,337 | A | 11/2000 | Carlson et al. |
| 6,201,100 | B1 | 3/2001 | Gorkovenko et al. |
| 6,214,061 | B1 | 4/2001 | Visco et al. |
| 6,248,469 | B1 | 6/2001 | Formato et al. |
| 6,306,545 | B1 | 10/2001 | Carlson et al. |
| 6,402,795 | B1 | 6/2002 | Chu et al. |
| 6,413,284 | B1 | 7/2002 | Chu et al. |
| 6,413,285 | B1 | 7/2002 | Chu et al. |
| 6,432,584 | B1 | 8/2002 | Visco et al. |
| 6,488,721 | B1 | 12/2002 | Carlson |
| 6,544,688 | B1 * | 4/2003 | Cheng ................ H01M 4/5815 429/234 |
| 6,737,197 | B2 | 5/2004 | Chu et al. |
| 6,962,666 | B2 | 11/2005 | Ravet et al. |
| 6,991,662 | B2 | 1/2006 | Visco et al. |
| 7,070,632 | B1 | 7/2006 | Visco et al. |
| 7,081,142 | B1 * | 7/2006 | Carlson ............... H01M 2/1673 29/623.5 |
| 7,160,603 | B2 | 1/2007 | Carlson |
| 7,175,937 | B2 | 2/2007 | Cho et al. |
| 7,247,408 | B2 | 7/2007 | Skotheim et al. |
| 7,771,870 | B2 | 8/2010 | Affinito et al. |
| 7,785,730 | B2 | 8/2010 | Affinito et al. |
| 8,076,024 | B2 | 12/2011 | Affinito et al. |
| 8,087,309 | B2 | 1/2012 | Kelley et al. |
| 8,105,717 | B2 | 1/2012 | Skotheim et al. |
| 8,114,171 | B2 | 2/2012 | Visco et al. |
| 8,139,343 | B2 | 3/2012 | Gibson et al. |
| 8,182,943 | B2 | 5/2012 | Visco et al. |
| 8,197,971 | B2 | 6/2012 | Skotheim et al. |
| 8,202,649 | B2 | 6/2012 | Visco et al. |
| 8,329,343 | B2 | 12/2012 | Yamaguchi et al. |
| 8,334,075 | B2 | 12/2012 | Visco et al. |
| 8,338,034 | B2 | 12/2012 | Affinito et al. |
| 8,415,054 | B2 | 4/2013 | Skotheim et al. |
| 8,436,125 | B2 | 5/2013 | Cristadoro et al. |
| 8,603,680 | B2 | 12/2013 | Affinito et al. |
| 8,617,748 | B2 | 12/2013 | Mikhaylik et al. |
| 8,623,557 | B2 | 1/2014 | Skotheim et al. |
| 8,728,661 | B2 | 5/2014 | Skotheim et al. |
| 8,753,771 | B2 | 6/2014 | Skotheim et al. |
| 8,871,387 | B2 | 10/2014 | Wang et al. |
| 8,936,870 | B2 | 1/2015 | Affinito et al. |
| 8,968,928 | B2 | 3/2015 | Wang et al. |
| 9,005,311 | B2 | 4/2015 | Safont Sempere et al. |
| 9,040,197 | B2 | 5/2015 | Affinito et al. |
| 9,040,201 | B2 | 5/2015 | Affinito et al. |
| 9,065,149 | B2 | 6/2015 | Skotheim et al. |
| 9,397,342 | B2 | 7/2016 | Skotheim et al. |
| 9,548,492 | B2 * | 1/2017 | Affinito ............... H01M 2/1673 |
| 9,653,735 | B2 | 5/2017 | Skotheim et al. |
| 9,653,750 | B2 | 5/2017 | Laramie et al. |
| 9,728,768 | B2 | 8/2017 | Mikhaylik et al. |
| 9,735,411 | B2 | 8/2017 | Viner et al. |
| 9,755,268 | B2 | 9/2017 | Fleischmann et al. |
| 2001/0014420 | A1 | 8/2001 | Takeuchi et al. |
| 2001/0036573 | A1 * | 11/2001 | Jen ....................... H01M 2/145 429/144 |
| 2002/0012846 | A1 | 1/2002 | Skotheim et al. |
| 2002/0015885 | A1 | 2/2002 | Hara et al. |
| 2002/0144899 | A1 | 10/2002 | Arcella et al. |
| 2004/0126653 | A1 | 7/2004 | Visco et al. |
| 2004/0146786 | A1 | 7/2004 | Sato et al. |
| 2004/0185335 | A1 | 9/2004 | Carlson |
| 2004/0209159 | A1 | 10/2004 | Lee et al. |
| 2004/0253510 | A1 | 12/2004 | Jonghe et al. |
| 2005/0008938 | A1 * | 1/2005 | Cho ....................... H01M 4/04 429/246 |
| 2005/0095504 | A1 | 5/2005 | Kim et al. |
| 2006/0051677 | A1 | 3/2006 | Matsushima et al. |
| 2006/0115579 | A1 | 6/2006 | Mukherjee et al. |
| 2006/0121345 | A1 | 6/2006 | Yasuda et al. |
| 2006/0130320 | A1 * | 6/2006 | Murosawa ............. H01G 4/30 29/829 |
| 2006/0147801 | A1 | 7/2006 | Yasuda et al. |
| 2006/0147802 | A1 | 7/2006 | Yasuda et al. |
| 2006/0180269 | A1 * | 8/2006 | Karatsu ................. H01G 4/30 156/230 |
| 2006/0222954 | A1 | 10/2006 | Skotheim et al. |
| 2006/0238203 | A1 | 10/2006 | Kelley et al. |
| 2007/0072036 | A1 | 3/2007 | Berta et al. |
| 2007/0106057 | A1 | 5/2007 | Watanabe et al. |
| 2007/0166617 | A1 | 7/2007 | Gozdz et al. |
| 2007/0221265 | A1 | 9/2007 | Affinito et al. |
| 2007/0224502 | A1 | 9/2007 | Affinito et al. |
| 2008/0014501 | A1 | 1/2008 | Skotheim et al. |
| 2008/0020923 | A1 | 1/2008 | Debe et al. |
| 2008/0057397 | A1 | 3/2008 | Skotheim et al. |
| 2008/0187663 | A1 | 8/2008 | Affinito |

(56) References Cited

U.S. PATENT DOCUMENTS

| | | |
|---|---|---|
| 2008/0190841 A1 | 8/2008 | Pascaly et al. |
| 2008/0213672 A1 | 9/2008 | Skotheim et al. |
| 2008/0318128 A1 | 12/2008 | Simoneau et al. |
| 2009/0029250 A1 | 1/2009 | Stebani et al. |
| 2009/0035646 A1 | 2/2009 | Mikhaylik et al. |
| 2009/0061288 A1 | 3/2009 | Gordon et al. |
| 2009/0197158 A1 | 8/2009 | Ogawa et al. |
| 2009/0200986 A1 | 8/2009 | Kopera |
| 2009/0226809 A1 | 9/2009 | Vu et al. |
| 2009/0291353 A1 | 11/2009 | Affinito et al. |
| 2010/0035128 A1 | 2/2010 | Scordilis-Kelley et al. |
| 2010/0129699 A1 | 5/2010 | Mikhaylik et al. |
| 2010/0233547 A1 | 9/2010 | Baba et al. |
| 2010/0239914 A1 | 9/2010 | Mikhaylik et al. |
| 2010/0291442 A1* | 11/2010 | Wang ............... H01M 4/0404 429/231.95 |
| 2010/0327811 A1 | 12/2010 | Affinito et al. |
| 2011/0059361 A2 | 3/2011 | Wilkening et al. |
| 2011/0068001 A1* | 3/2011 | Affinito ............... H01M 4/13 204/242 |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0177398 A1 | 7/2011 | Affinito et al. |
| 2011/0206992 A1 | 8/2011 | Campbell et al. |
| 2011/0244336 A1 | 10/2011 | Schmitz et al. |
| 2011/0311856 A1 | 12/2011 | Matusi et al. |
| 2012/0043940 A1 | 2/2012 | Affinito et al. |
| 2012/0048729 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0214043 A1 | 8/2012 | Olschimke et al. |
| 2012/0219842 A1 | 8/2012 | Visco et al. |
| 2012/0270112 A1 | 10/2012 | Visco et al. |
| 2012/0276449 A1 | 11/2012 | Skotheim et al. |
| 2012/0301774 A1 | 11/2012 | Jiang et al. |
| 2013/0004852 A1 | 1/2013 | Visco et al. |
| 2013/0017441 A1 | 1/2013 | Affinito et al. |
| 2013/0059192 A1 | 3/2013 | Kajita et al. |
| 2013/0095380 A1 | 4/2013 | Affinito et al. |
| 2013/0118980 A1 | 5/2013 | Mueller-Cristadoro et al. |
| 2013/0143096 A1 | 6/2013 | Affinito et al. |
| 2013/0149587 A1 | 6/2013 | Yu et al. |
| 2013/0216915 A1 | 8/2013 | Affinito et al. |
| 2013/0224601 A1 | 8/2013 | Burnside et al. |
| 2013/0252103 A1 | 9/2013 | Mikhaylik et al. |
| 2013/0266842 A1 | 10/2013 | Woehrle et al. |
| 2013/0280605 A1 | 10/2013 | Affinito et al. |
| 2014/0045070 A1 | 2/2014 | Mueller-Cristadoro et al. |
| 2014/0045075 A1 | 2/2014 | Mueller-Cristadoro et al. |
| 2014/0062411 A1 | 3/2014 | Mikhaylik et al. |
| 2014/0072873 A1 | 3/2014 | Wang et al. |
| 2014/0123477 A1 | 5/2014 | Safont Sempere et al. |
| 2014/0127419 A1 | 5/2014 | Fleischmann et al. |
| 2014/0127577 A1 | 5/2014 | Fleischmann et al. |
| 2014/0193723 A1 | 7/2014 | Kumaresan et al. |
| 2014/0205912 A1 | 7/2014 | Skotheim et al. |
| 2014/0272565 A1 | 9/2014 | Gronwald et al. |
| 2014/0272594 A1 | 9/2014 | Safont Sempere et al. |
| 2014/0272595 A1 | 9/2014 | Cristadoro et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0318552 A1 | 11/2015 | Skotheim et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2017/0141402 A1 | 5/2017 | Affinito et al. |
| 2017/0250390 A1 | 8/2017 | Laramie et al. |
| 2017/0352863 A1 | 12/2017 | Mikhaylik et al. |
| 2017/0373321 A1 | 12/2017 | Skotheim et al. |

FOREIGN PATENT DOCUMENTS

| | | |
|---|---|---|
| CN | 1728418 A | 2/2006 |
| CN | 1883066 A | 12/2006 |
| CN | 101479868 A | 7/2009 |
| DE | 199 16 043 A1 | 10/2000 |
| EP | 1 296 391 A1 | 3/2003 |
| EP | 1693910 A | 8/2006 |
| JP | H07-017197 A | 1/1995 |
| JP | H08-267943 A | 10/1996 |
| JP | H11-114481 A2 | 4/1999 |
| JP | H11-256113 A2 | 9/1999 |
| JP | 2000-040506 A2 | 2/2000 |
| JP | 2001-085065 A | 3/2001 |
| JP | 2002-363898 A2 | 12/2002 |
| JP | 2005-044796 A2 | 2/2005 |
| JP | 2005-063978 A2 | 3/2005 |
| JP | 2005-096200 A2 | 4/2005 |
| JP | 2005-199190 A2 | 7/2005 |
| JP | 2006-108066 A2 | 4/2006 |
| JP | 2006-155900 A2 | 6/2006 |
| JP | 2006-216565 A2 | 8/2006 |
| JP | 2006-236685 A2 | 9/2006 |
| JP | 2008-520804 T2 | 6/2008 |
| KR | 10-2005-0007484 A | 1/2005 |
| KR | 10-2006-0109435 A | 10/2006 |
| WO | WO 99/033125 A1 | 7/1999 |
| WO | WO 99/033130 A1 | 7/1999 |
| WO | WO 2001/039303 A1 | 5/2001 |
| WO | WO 03/99556 A1 | 12/2003 |
| WO | WO 2006/027886 A1 | 3/2006 |
| WO | WO 2006/055233 A1 | 5/2006 |
| WO | WO 2007/124011 A2 | 11/2007 |
| WO | WO 2009/029270 | 3/2009 |
| WO | WO 2009/054987 A1 | 4/2009 |
| WO | WO 2011/023110 | 3/2011 |
| WO | WO 2011/147723 A1 | 12/2011 |
| WO | WO 2012/025543 A1 | 3/2012 |
| WO | WO 2012/156903 A1 | 11/2012 |
| WO | WO 2013/072224 A1 | 5/2013 |
| WO | WO 2014/032948 A1 | 3/2014 |

OTHER PUBLICATIONS

Extended European Search Report dated Nov. 7, 2013 for EP 10814062.5.
[No Author] Chemical Properties of Vinyl Ether. 2008.
[No Author] SYL-OFF, Formulation Guide. 2007.
Addae-Mensay et al. J Micromech Microeng. 2007; 17:N41-N46.
Nakamatsu et al. Jap J Appl Phys. 2005; 44(11):8186-8188.
Saxena. Polyvinyl Alcohol Chemical and Technical Assessment. 2004.
International Preliminary Report on Patentability for PCT/US2010/002326 dated Feb. 22, 2012.
International Search Report and Written Opinion for PCT/US2014/025618 dated Jun. 27, 2014.
International Preliminary Report on Patentability for PCT/US2014/025618 dated Sep. 24, 2015.
International Search Report and Written Opinion for PCT/EP2014/054994 dated May 6, 2014.
International Search Report and Written Opinion for PCT/US2014/017093 dated Nov. 18, 2014.
Extended European Search Report for EP 15155510.9 dated Jul. 7, 2015.
International Search Report and Written Opinion for PCT/US2015/016281 dated Jun. 18, 2015.
[No Author Listed] Sigma-Aldrich Product Specification Sheet for Poly(ethylene oxide). Accessed on Jun. 19, 2015.
[No Author Listed] SYL-OFF® 7922 Catalyst Emulsion Safety Data Sheet. Dow Corning. Jan. 14, 2015.

(56) References Cited

OTHER PUBLICATIONS

Alamgir et al., Lithium Batteries, New Materials, Developments and Perspectives, Chapter 3. Elsevier, Amsterdam. 1994; 93-136.
Dominey, Lithium Batteries, New Materials, Developments and Perspectives, Chapter 4. Elsevier, Amsterdam. 1994; 137-165.
Kim et al., Surface-modified membrane as a separator for lithium-ion polymer battery. Energies. Apr. 23, 2010; 3:866-885.
U.S. Appl. No. 15/635,443, filed Jun. 28, 2017, Mikhaylik et al.
U.S. Appl. No. 15/459,152, filed Mar. 15, 2017, Laramie et al.

* cited by examiner

RELEASE SYSTEM FOR ELECTROCHEMICAL CELLS

RELATED APPLICATIONS

This application is a divisional of U.S. patent application Ser. No. 12/862,513, filed Aug. 24, 2010, which claims priority under 35 U.S.C. § 119(e) to U.S. Provisional Patent Application No. 61/236,322, filed Aug. 24, 2009, each of which is incorporated herein by reference in its entirety for all purposes.

FIELD OF INVENTION

The present invention relates generally to electrochemical cells, and more specifically, to release systems for electrochemical cells.

BACKGROUND

A typical electrochemical cell includes a cathode and an anode which participate in an electrochemical reaction. To fabricate an electrode, an electroactive material may be deposited onto a component of the electrochemical cell such as a current collector. In turn, the current collector may be supported by a substrate that has suitable physical and chemical properties (e.g., a substantial thickness) that allow it to be compatible with the processes required to form the electrode. Some such substrates, however, may have little or no function in the electrochemical cell; therefore, their incorporation into the cell adds additional weight but does not substantially increase performance. Accordingly, alternative articles or methods that would eliminate the need or reduce the weight of non-functioning components of an electrochemical cell would be beneficial. Fabrication of other electrochemical cell components may also benefit from such alternative articles and methods.

SUMMARY OF THE INVENTION

Electrochemical cells, and more specifically, release systems for electrochemical cells are provided. The subject matter of the present invention involves, in some cases, interrelated products, alternative solutions to a particular problem, and/or a plurality of different uses of one or more systems and/or articles.

In one set of embodiments, a series of electrodes are provided. In one embodiment, an electrode comprises a current collector, an electroactive material layer, and a release layer, wherein the current collector is positioned between the electroactive layer and the release layer. In some cases, the current collector is positioned adjacent the release layer, and the electroactive material layer is positioned adjacent the current collector. The release layer may comprise a polymeric material or any other suitable material.

In another embodiment, an electrode comprises a first electroactive material layer, a first current collector adjacent the first electroactive layer, a first release layer adjacent the first current collector, a second current collector adjacent the first release layer, and a second electroactive material layer adjacent the second current collector.

In one set of embodiments, a series of methods are provided. In one embodiment, a method of fabricating an electrode comprising at least a current collector and an electroactive material comprises positioning a release layer on a surface of a carrier substrate and positioning a current collector on a surface of the release layer. The method also includes positioning an electroactive material layer adjacent the current collector layer, and releasing the electrode from the carrier substrate.

In another embodiment, a method comprises providing a first electrode portion comprising a first electroactive material layer, a first current collector, and a first release layer. The method includes providing a second electrode portion comprising a second electroactive material layer, a second current collector, and a second release layer. The first and second electrode portions are laminated to form an assembly wherein the first and second release layers are facing one another.

In one set of embodiments, an article is provided. In one embodiment, an article comprises an electroactive material layer, a current collector adjacent the electroactive layer, and a release layer in contact with the current collector. The article also includes a carrier substrate having a thickness greater than or equal to the thickness of the release layer in contact with the release layer, wherein the carrier substrate is releasable from the current collector by the release layer.

In one set of embodiments, an electrochemical cell is provided. In one embodiment, an electrochemical cell comprises an anode, an electrolyte, and a cathode. The electrochemical cell also includes a release layer having an adhesive affinity to at least one component of the electrochemical cell greater than its adhesive affinity to a substrate on which at least a portion of the electrochemical cell was fabricated, and providing essentially no electrochemical, structural, or activational feature to the electrochemical cell.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control. All patents and patent applications disclosed herein are incorporated by reference in their entirety for all purposes.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
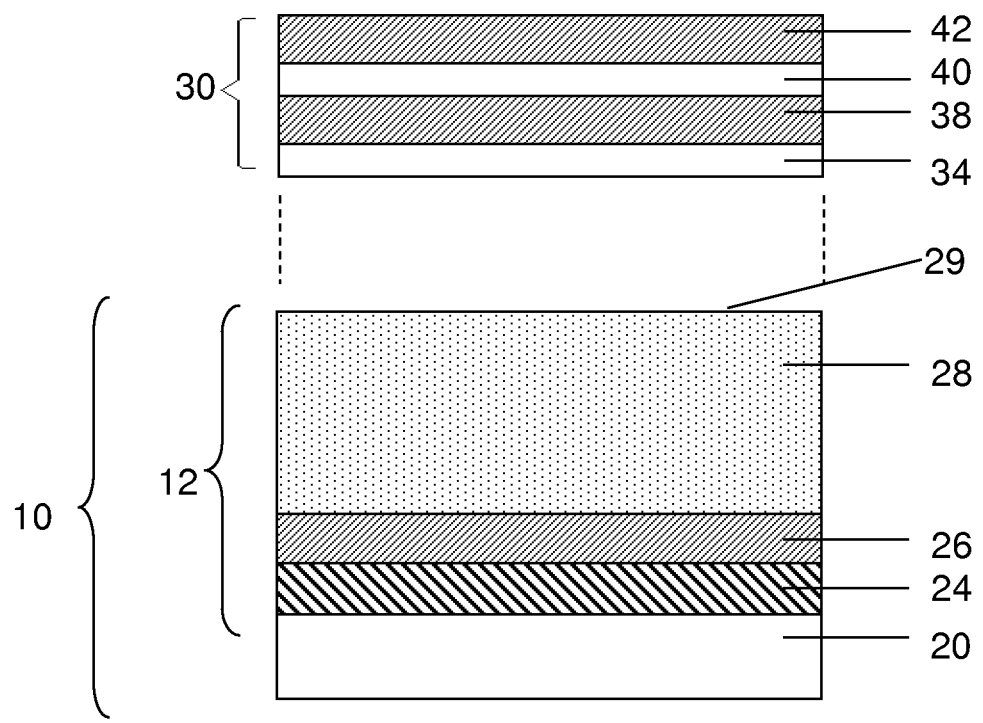
FIG. 1A shows an electrode assembly including an electroactive material layer, a current collector, a release layer, and a carrier substrate according to one set of embodiments.

The present invention relates generally to electrochemical cells, and more specifically, to release systems for the fabrication of electrochemical cells. In particular, release layer arrangements, assemblies, methods and compositions that facilitate the fabrication of electrochemical cell components, such as electrodes, are presented. In some embodiments, methods of fabricating an electrode involve the use of a release layer to separate portions of the electrode from a carrier substrate on which the electrode was fabricated. For example, an intermediate electrode assembly may include, in sequence, an electroactive material layer, a current collector layer, a release layer, and a carrier substrate. The carrier substrate can facilitate handling of the electrode during fabrication and/or assembly, but may be released from the electrode prior to commercial use.

Certain existing methods of fabricating electrodes involve depositing electrode components onto a substrate that is eventually incorporated into an electrochemical cell. The substrate must be of sufficient thickness and/or formed of a suitable material in order to be compatible with the electrode fabrication process. For example, fabrication of an electrode comprising lithium metal as an electroactive material may involve vacuum deposition of lithium metal at relatively high temperatures and high rates that would cause certain substrates to buckle unless the substrate is made of a certain material or has a sufficient thickness. Some substrates that are suitable for such fabrication steps may, however, end up reducing the performance of the cell if the substrate is incorporated into the cell. For instance, thick substrates may prevent buckling and therefore allow the deposition of a thick layer of an electroactive material, but may reduce the specific energy density of the cell. Furthermore, certain substrates that are incorporated into the electrochemical cell may react adversely with chemical species during cycling. To remedy these issues, the present invention involves, in certain aspects, methods of fabricating an electrode using a release layer to separate portions of the electrode from a carrier substrate, which can then be removed from the electrode during or after assembly of the electrode into an electrochemical cell. Advantageously, such a method can allow a larger variety of substrates and/or more extreme processing conditions to be used when fabricating electrodes compared to that when the substrate is incorporated into an electrochemical cell. The removal of a substrate from an electrochemical cell can also reduce the number adverse reactions that may occur in the cell during cycling. Inventive articles associated with such methods are also described.

The inventors have discovered within the context of the invention that certain materials and methods for fabricating release layers lead to suitable release layers that can be used for fabricating electrochemical cells. Release layers described herein are constructed and arranged to have one or more of the following features: relatively good adhesion to a first layer (e.g., a current collector, or in other embodiments, a carrier substrate or other layer) but relatively moderate or poor adhesion to a second layer (e.g., a carrier substrate, or in other embodiments, a current collector or other layer); high mechanical stability to facilitate delamination without mechanical disintegration; high thermal stability; ability to withstand the application of a force or pressure applied to the electrochemical cell or a component of the cell during fabrication and/or during cycling of the cell; and compatibility with processing conditions (e.g., deposition of layers on top of the release layer, as well as compatibility with techniques used to form the release layer). Release layers may be thin (e.g., less than about 10 microns) to reduce overall battery weight if the release layer is incorporated into the electrochemical cell. A release layer should also be smooth and uniform in thickness so as to facilitate the formation of uniform layers on top of the release layer. Furthermore, release layers should be stable in the electrolyte and should not interfere with the structural integrity of the electrodes in order for the electrochemical cell to have a high electrochemical "capacity" or energy storage capability (i.e., reduced capacity fade). In some cases, release layers from two electrode portions can be adhered together, optionally using an adhesion promoter as described in more detail below.

The release layers described herein may be used for forming lithium-sulfur rechargeable electrochemical cells (i.e., cells including a sulfur-containing cathode and a lithium anode). It should be understood, however, that wherever lithium-sulfur cells are described, any suitable battery (including other alkali metal batteries, e.g., having an alkali metal anode, or even non-alkali metal batteries) can be used, and wherever cathodes including sulfur as an active cathode species are described herein, it is to be understood that any suitable cathode active species can be used. Additionally, although rechargeable batteries are intended to benefit from the invention, non-rechargeable (i.e., primary) batteries are intended to benefit from the invention as well. Furthermore, although embodiments of the invention are particularly useful for adhering an electrode to a carrier substrate, the present invention may be applicable to other applications in which release and/or temporary adhesion is desired.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; 4 U.S. Patent Applications, filed on even date herewith, each entitled "Electrochemical Cells Comprising Porous Structures Comprising Sulfur" (which claim priority to U.S. Provisional Application No. 61/237,903, filed Aug. 28, 2009, entitled "Electrochemical Cells Comprising Porous Structures Comprising Sulfur" to Scordilis-Kelley et al); a U.S. Patent Application, filed on even date herewith, entitled "Electrochemical Cell"; a U.S. Provisional Patent Application, filed on even date herewith, entitled "Electrically Non-Conductive Materials for Electrochemical Cells;" and Provisional Patent Apl. Ser. No. 61/236,322, filed Aug. 24, 2009, entitled "Release System for Electrochemical Cells".

Examples of release layers used in fabricating electrochemical cells are now provided.

FIG. 1A shows an electrode assembly that includes a release layer according to one embodiment of the invention. As shown in the illustrative embodiment of FIG. 1A, electrode assembly 10 includes several layers that are stacked together to form an electrode 12 (e.g., an anode or a cathode). Electrode 12 can be formed by positioning the layers on a carrier substrate 20. For example, electrode 12 may be formed by first positioning one or more release layers 24 on a surface of carrier substrate 20. As described in more detail below, the release layer serves to subsequently release the electrode from the carrier substrate so that the carrier substrate is not incorporated into the final electrochemical cell. To form the electrode, an electrode component such as a current collector 26 can be positioned adjacent the release layer on the side opposite the carrier substrate. Subsequently, an electroactive material layer 28 may be positioned adjacent current collector 26.

Optionally, additional layers can be positioned adjacent electroactive material layer 28. For example, a multi-layered structure 30 that protects the electroactive material from an electrolyte, may be positioned on a surface 29 of electroactive material layer 28. The multi-layer structure can include, for example, polymer layers 34 and 40, and single-ion conductive layers 38 and 42. Other examples and configurations of multi-layer structures are described in more detail in U.S. patent application Ser. No. 11/400,781, filed Apr. 6, 2006, entitled, "Rechargeable Lithium/Water, Lithium/Air Batteries" to Affinito et al., which is incorporated herein by reference in its entirety.

Figure 1B:
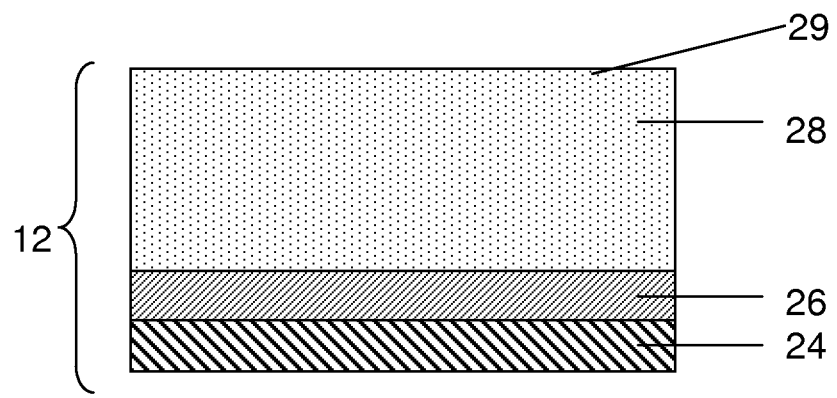
FIG. 1B shows an electrode formed by the use of the release layer and carrier substrate shown in FIG. 1A according to one set of embodiments.

After electrode assembly 10 has been formed, the carrier substrate 20 may be released from the electrode through the use of release layer 24. Release layer 24 can be either released along with the carrier substrate so that the release layer is not a part of the final electrode structure, or the release layer may remain a part of the final electrode structure as shown illustratively in FIG. 1B. The positioning of the release layer during release of the carrier substrate can be varied by tailoring the chemical and/or physical properties of the release layer. For example, if it is desirable for the release layer to be part of the final electrode structure, as shown in FIG. 1B, the release layer may be tailored to have a greater adhesive affinity to current collector 26 relative to its adhesive affinity to carrier substrate 20. On the other hand, if it is desirable for the release layer to not be part of an electrode structure, the release layer may be designed to have a greater adhesive affinity to carrier substrate 20 relative to its adhesive affinity to current collector 26. In the latter case, when a peeling force is applied to carrier substrate 20 (and/or to the electrode), the release layer is released from current collector 26 and remains on substrate 20.

In certain embodiments, carrier substrate 20 is left intact with electrode 12 as a part of electrode assembly 10 after fabrication of the electrode, but before the electrode is incorporated into an electrochemical cell. For instance, electrode assembly 10 may be packaged and shipped to a manufacturer who may then incorporate electrode 12 into an electrochemical cell. In such embodiments, electrode assembly 10 may be inserted into an air and/or moisture-tight package to prevent or inhibit deterioration and/or contamination of one or more components of the electrode assembly. Allowing carrier substrate 20 to remain attached to electrode 12 can facilitate handling and transportation of the electrode. For instance, carrier substrate 20 may be relatively thick and have a relatively high rigidity or stiffness, which can prevent or inhibit electrode 12 from distorting during handling. In such embodiments, carrier substrate can be removed by the manufacturer before, during, or after assembly of an electrochemical cell.

Although FIG. 1A shows release layer 24 positioned between carrier substrate 20 and current collector 26, in other embodiments the release layer may be positioned between other components of an electrode. For example, the release layer may be positioned adjacent surface 29 of electroactive material layer 28, and the carrier substrate may be positioned on the opposite side of the electroactive material layer (not shown). In some such embodiments, an electrode may be fabricated by first positioning one or more release layers onto a carrier substrate. Then, if any protective layer(s) such as multi-layered structure 30 is to be included, the protective layer(s) can be positioned on the one or more release layers. For example, each layer of a multi-layered structure may be positioned separately onto a release layer, or the multi-layered structure may be pre-fabricated and positioned on a release layer at once. The electroactive material layer may then be positioned on the multi-layered structure. (Of course, if a protective layer such as a multi-layered structure is not included in the electrode, the electroactive material layer can be positioned directly on the release layer.) Afterwards, any other suitable layers such as a current collector may be positioned on the electroactive material layer. To form the electrode, the carrier substrate can be removed from the protective layer(s) (or the electroactive material layer where protective layers are not used) via the release layer. The release layer may remain with the electrode or may be released along with the carrier substrate.

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "immediately adjacent", "in contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

It should be understood, therefore, that in the embodiments illustrated in FIGS. 1A and 1B and in other embodiments described herein, one or more additional layers may be positioned between the layers shown in the figures. For example, one or more additional layers may be positioned between current collector 26 and release layer 24, and/or one or more additional layers may be positioned between release layer 24 and carrier substrate 20. Furthermore, one or more layers may be positioned between other components of the cell. For example, one or more primer layers can be positioned between a current collector and an electroactive material layer (e.g., a positive or negative electroactive material) to facilitate adhesion between the layers. Examples of suitable primer layers are described in International Patent Application Serial No. PCT/US2008/012042, published as International Publication No. WO 2009/054987, filed Oct. 23, 2008, and entitled "Primer For Battery Electrode", which is incorporated herein by reference in its entirety. Furthermore, one or more layers such as plasma treatment layers may be deposited on surface 29 of electroactive material layer 28, optionally between the electroactive material layer and multi-layer structure 30.

Although FIGS. 1A and 1B show a single release layer 24 as part of electrode assembly 10, any suitable number of release layers may be used. For example, a release system may include 2, 3, 4 or more layers. The number of layers used in a release system may depend at least in part on whether the release layer(s) is to be incorporated into the final electrochemical cell, or whether the release layer(s) is removed along with the carrier substrate. For example, in some embodiments in which the release layer(s) is to be incorporated into the electrochemical cell, a fewer number of release layer(s) may be desirable (e.g., less than 3, or less than 2 release layers). This is because a fewer number of release layers can reduce the complexity of the fabrication process as well as reduce the weight of the overall electrochemical cell, thereby increasing the specific energy density of the cell.

In other embodiments, however, more than one release layer is used to fabricate a component of an electrochemical cell. For instance, a first release layer may be positioned adjacent a carrier substrate and may have, for example, a relatively high adhesive affinity to the carrier substrate. The first release layer may be chosen because it is compatible with certain processing conditions, but it may have a relatively high adhesive affinity to a second surface (e.g., current collector 26 of FIG. 1A). In such embodiments, the release layer would not allow release of the carrier substrate. Thus, a second release layer may be positioned between the first release layer and the second surface to allow adequate release of the carrier substrate. In one embodiment, the second release layer has a relatively high adhesive affinity to the first release layer, but a relatively low adhesive affinity to the second surface. As such, the application of a force could allow removal of the carrier substrate and both release layers from the second surface. In another embodiment, the second release layer has a relatively low adhesive affinity to the first release layer and relatively high adhesive affinity to the second surface. In such embodiments, the application of a force could allow removal of the carrier substrate and the first release layer, which the second release layer and the second surface remain intact. Other configurations of release layers are also possible.

As shown in FIG. 1B, release layer 24 can be a part of the final electrode and/or electrochemical cell once fabricated. In some embodiments, release layer 24 provides essentially no electrochemical, structural and/or activational feature to the electrochemical cell after being incorporated into the cell. For example, in some embodiments, release layer 24 does not substantially act as a separator, an electroactive material, or a protective layer for an electroactive material, does not substantially contribute to the mechanical stability of the electrochemical cell, and/or does not substantially facilitate the conduction of ions and/or electrons across the release layer. That is, the release layer may be substantially non-ionically conductive and/or non-electrically conductive. In some cases, a release layer, once incorporated into an electrochemical cell, does not act as an activational feature such as maintaining two components of the cell out of contact until the cell is ready for use. As such, the release layer may have essentially no function other than to have release characteristics allowing a first layer or component to be separated from a second layer or component during fabrication of the electrochemical cell. As described herein, such a release layer having essentially no other function other than to act as a release layer may nevertheless be incorporated into the cell because the advantages of facilitating the fabrication process outweighs the potential negative effects of incorporating the release layer into the cell (e.g., by reducing specific energy density of the cell).

In other embodiments, a release layer does have one or more functions once incorporated into an electrochemical cell. For example, the release layer may act as a separator, an electroactive material, or a protective layer for an electroactive material, may contribute to the mechanical stability of the electrochemical cell, and/or may facilitate the conduction of ions and/or electrons across the release layer.

In some particular embodiments, a release layer has an adhesive function of allowing two components of an electrochemical cell to adhere to one another. One such example is shown in the embodiments illustrated in FIGS. 2A and 2B. As shown illustratively in FIG. 2A, a first electrode portion 12A may include one or more release layers 24A, a current collector 26A, and an electroactive material layer 28A. Such an electrode portion may be formed after being released from a carrier substrate, e.g., using the method described above in connection with FIGS. 1A and 1B. Similarly, a second electrode portion 12B may include a release layer 24B, a current collector 26B, and an electroactive material layer 28B. Additional layers can also be deposited onto surfaces 29A and/or 29B of electrode portions 12A and 12B respectively, as described above.

Figure 2A:
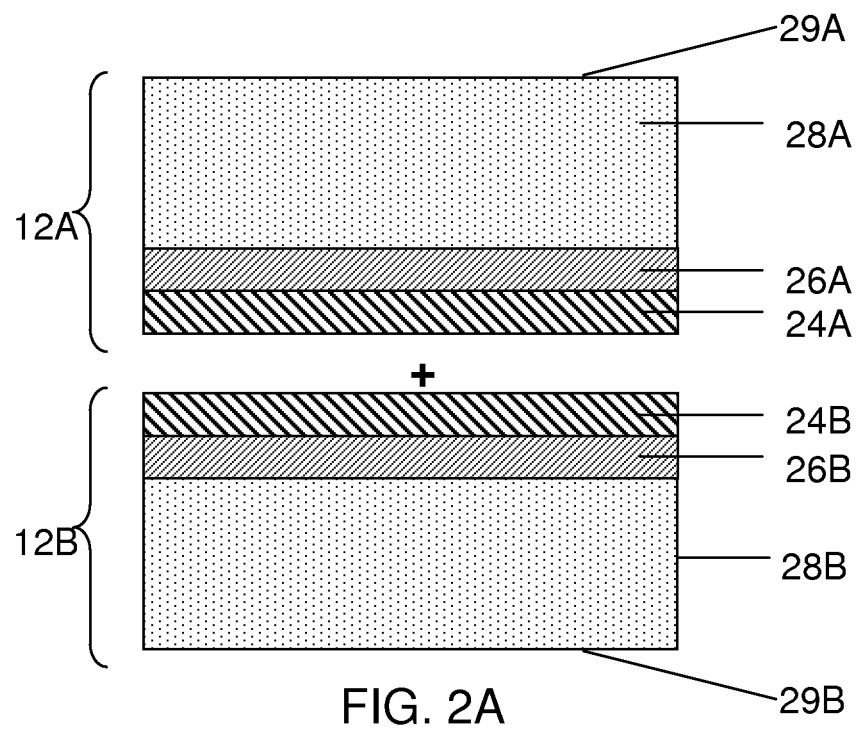
FIG. 2A shows the joining of two electrodes to form an electrode assembly according to one set of embodiments.
Figure 2B:
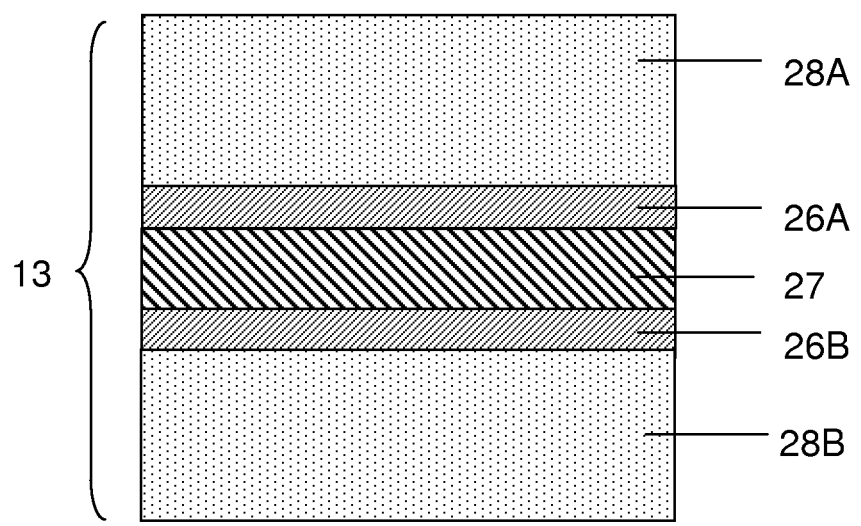
FIG. 2B shows an electrode assembly formed by the process shown in FIG. 2A according to one set of embodiments.

As shown in the embodiment illustrated in FIG. 2B, a back-to-back electrode assembly 13 may be formed by joining electrode portions 12A and 12B, e.g., via release layers 24A and 24B. The electrode portions may be separate, independent units or part of the same unit (e.g., folded over). As illustrated in FIG. 2B, release layers 24A and 24B are facing one another. In other embodiments, however, the electrode portions can be stacked upon one another in series such that release layers 24A and 24B do not face one another in the final configuration.

Any suitable method may be used to join two components of an electrochemical cell via one or more release layers. In some embodiments, release layers 24A and 24B are formed of one or more materials that naturally have a relatively high adhesive affinity to each other, e.g., either inherently or after being activated. In some embodiments, an adhesion promoter may be used to facilitate adhesion of two components. For example, the materials used to form the release layers may be joined by applying an external stimulus such as heat and/or light to activate a surface of a release layer to make it more adhesive. In other embodiments, an adhesion promoter in the form of a chemical such as a crosslinker can be applied to a surface of a release layer to facilitate joining with another layer. Adhesion promoters in the form of solvents and/or adhesives can also be used, as described in more detail below. In yet other embodiments, a release layer may inherently have a high adhesive affinity to a material in which it is to be joined and no adhesion promoter is needed. Pressure may optionally be applied during the joining of two components.

In some embodiments, two components of an electrochemical cell such as electrode portions 12A and 12B of FIG. 2A are joined with one another via a lamination process. A lamination process may involve, for example, applying an adhesion promoter such as a solvent (optionally containing other materials) to a surface of release layers 24A and/or 24B and solvating at least a portion of the release layer(s) to make the release layers more susceptible to adhesion. The release layers can then be brought together to join the release layers. After joining (or, in some embodiments, prior to joining), the solvent can be optionally removed, e.g., by a drying process. In some such embodiments, e.g., when release layers 24A and 24B are formed of the same material, the joining of the release layers can result in a single layer 27, as shown in the embodiment illustrated in FIG. 2B. For instance, where release layers 24A and 24B are formed of a polymeric material, the joining of the release layers (e.g., after solvation) can cause polymer chains at the surface of one release layer to intertwine with polymer chains at the second release layer. In some cases, intertwining of the polymer chains can occur without the application of additional chemicals and/or conditions (e.g., without the use of an adhesion promoter). In other embodiments, intertwining of polymer chain can be facilitated by subjecting the polymer to certain conditions such as cross linking or melting, as described in more detail below.

When first and second release layers are joined together (optionally using an adhesion promoter), the adhesive strength between the two release layers may be greater than the adhesive strength between the first release layer and a layer opposite the second release layer (e.g., between the first release layer and the current collector). In other embodiments, the adhesive strength between the two release layers may be less than the adhesive strength between the first release layer and a layer opposite the second release layer (e.g., between the first release layer and the current collector). Adhesive strengths can be determined by those of ordinary skill in the art in combination with the description provided herein.

As described herein, in some embodiments, lamination may involve applying an adhesion promoter (e.g., in the form of an adhesive or a solvent combination) to a surface of a release layer prior to joining of the two electrodes. For instance, an adhesive (e.g., a polymer or any other suitable material) may be added to a solvent or solvent combination to form an adhesion promoter formulation, which is then applied uniformly to a surface of release layer 24A (and/or 24B). When applying an adhesion promoter to the release layer(s), the adhesion promoter may be applied to only one of the release layers, or to both release layers. The two surfaces to be adhered can then be joined, optionally followed by the application of heat, pressure, light, or other suitable condition to facilitate adhesion.

As described in more detail below, an adhesion promoter may form a discrete layer at the interface between the two release layers to be joined (or between any two components to be joined). The layer of adhesion promoter may, in some cases, be very thin (e.g., between 0.001 and 3 microns thick), as described in more detail below. Advantageously, using a thin layer of adhesion promoter can increase the specific energy density of the cell compared to using a thicker layer of adhesion promoter.

In other embodiments, an adhesion promoter does not form a discrete layer at the interface between the two release layers. In some such embodiments, the adhesion promoter is a solvent or solvent combination that wets the surface(s) of the release layer(s), and does not include a polymer and/or any other non-solvent material. The solvent in the adhesion promoter may solvate, dissolve, and/or activate portions of the release layer surface to promote adhesion of the release layer with another release layer.

In other embodiments in which an adhesion promoter does not form a discrete layer at the interface between the two release layers, the adhesion promoter formulation may include a solvent or solvent combination that wets the surface(s) of the release layer(s) along with a polymer in relatively small amounts (e.g., less than 5%, less than 4%, less than 3%, less than 2%, or less than 1% by weight of the adhesion promoter formulation).

In some cases in which the adhesion promoter includes a polymer (or any other non-solvent material) in its formulation, the type, amount, and molecular weight of the polymer (or other non-solvent material) may be chosen such that a discrete layer is not formed at the interface between two release layers. For instance, even though the adhesion promoter may be applied to the surface of the release layer in the form of a layer or a coating, after joining the release layers, the polymer or other non-solvent material in the adhesion promoter formulation may migrate into the pores or interstices of the release layer(s) or be miscible with the release layer(s) such that a discrete layer of adhesion promoter is not formed. In other embodiments, the polymer or non-solvent material of the adhesion promoter formulation may join with polymer chains of the release layer(s), and the joined polymer chains may rearrange within the release layer(s) such that a discrete layer of adhesion promoter is not formed. In some cases, such rearrangement and/or migration causes at least a portion of the adhesion promoter to be interspersed (e.g., uniformly or non-uniformly) in the first and/or second release layers. In certain embodiments, a substantial portion (e.g., substantially all) of the adhesion promoter is interspersed (e.g., uniformly or non-uniformly) in the first and/or second release layers. In some embodiments, such rearrangement and/or migration occurs upon assembly of the electrode or electrochemical cell. In other embodiments, such rearrangement and/or migration occurs during cycling of the electrochemical cell.

After assembly of the electrode and/or cell, all or portions of the adhesion promoter may be positioned between first and second electroactive materials (e.g., electroactive anode materials), between first and second current collectors, between first and second release layers, interspersed in first and/or second release layers, interspersed in a single release layer, or combinations thereof.

Further description of adhesion promoters are described in more detail below.

Although FIG. 2B shows a single layer 27 formed by the joining of two release layers 24A and 24B of FIG. 2A, it should be understood that other configurations are also possible. For instance, in some cases release layers 24A and 24B are formed of different materials so that the joining of the two release layers results in two different intermediate layers. In yet other embodiments, only one component of an electrochemical cell to be joined includes a release layer, but a second component to be joined does not include a release layer. For example, electrode portion 12A of FIG. 2A may include release layer 24A, but a second electrode portion to be joined with electrode portion 12A does not include a release layer. In some such embodiments, release layer 24A may also have sufficient adhesive characteristics that allow it to be joined directly to a component the second electrode. Such a release layer may be designed to not only have a high adhesive affinity to a surface of the first electrode portion (e.g., currently collector 26A) and a relatively low adhesive affinity to a carrier substrate on which the first electrode portion was fabricated, but also a relatively high adhesive affinity to a surface of the second electrode portion. In other embodiments, an adhesion promoter that has a high adhesive affinity to both the release layer and the second electrode portion can be used. Suitable screening tests for choosing appropriate materials to be used as release layers and/or adhesion promoters are described in more detail below.

In some embodiments, an electrode assembly including laminated back-to-back electrode portions (e.g., at least two electroactive layers separated by at least a current collector and optionally other components), includes a release layer having a relatively low overall thickness. The release layer in this configuration may be a single layer or a combined layer (e.g., two layers adhered together using an adhesion promoter) formed from the same or different materials as described herein (e.g., layer 27 of FIG. 2B). The total thickness of the release layer in this configuration may be, for example, between 1-10 microns thick, between 1-7 microns thick, between 1-6 microns thick, between 1-5 microns thick, or between 1-3 microns thick. In certain embodiments, the thickness of the release layer in this configuration is about 10 microns or less, about 6 microns or less, about 7 microns or less, about 5 microns or less, or about 3 microns or less.

In another embodiment, two components of an electrochemical cell such as electrode portions 12A and 12B are joined after removal of both release layers 24A and 24B. For example, during fabrication of the electrode, the release layer may be released along with the carrier substrate, leaving behind only current collector 26, electroactive material layer 28, and optionally additional layers adjacent the electroactive material layer. Such an electrode portion can be joined with another electrode portion and/or another component of the electrochemical cell by applying an adhesion promoter such as an adhesive to one or more surfaces to be joined. In other embodiments, the two electrode layers are not joined by any adhesion promoter (e.g., adhesive) or any release layer, but are simply laid against one another, e.g., in a "rolled" configuration, as described in more detail below. Advantageously, in such and other embodiments (e.g., as shown in FIG. 2B), a support for the current collector and electroactive material layer(s) is not needed and the electrochemical cell is self-supporting. This configuration can reduce the weight of the electrochemical cell, thereby increasing the cell's energy density.

It should be understood that while FIGS. 2A and 2B show the joining of two electrode portions via release layers 24A and/or 24B, in other embodiments the methods and articles described herein can be used to join an electrode portion with a different component of an electrochemical cell, such as a solid separator and/or a protective layer. Furthermore, while FIGS. 1 and 2 show the use of one or more release layers for forming an electrode, the methods and articles described herein can also be used to fabricate other components of a cell such as a separator and/or a protective layer.

A release layer to be used in fabricating components of an electrochemical cell may be formed of any suitable material and will depend, at least in part, on factors such as the particular type of carrier substrate used, the material in contact with the other side of the release layer, whether the release layer is to be incorporated into the final electrochemical cell, and whether the release layer has an additional function after being incorporated into the electrochemical cell. Furthermore, a release layer may be formed of a suitable material allowing it to have a relatively high adhesive affinity to a first layer (e.g., a current collector, or in other embodiments, a carrier substrate or other layer) but a relatively moderate or poor adhesive affinity to a second layer (e.g., a carrier substrate, or in other embodiments, a current collector or other layer). The release layer may also have a high mechanical stability to facilitate delamination without mechanical disintegration and/or a high thermal stability. The material properties of the release should also be compatible with certain processing conditions. If the release layer is incorporated into a final electrochemical cell, the release layer should be formed of a material that is stable in the electrolyte and should not interfere with the structural integrity of the electrodes in order for the electrochemical cell to have a high electrochemical "capacity" or energy storage capability (i.e., reduced capacity fade).

Moreover, in certain embodiments a release layer used to form a component of an electrochemical cell is designed to withstand the application of a force or pressure applied to the component during fabrication and/or during cycling of the cell. For example, a release layer described herein may be compatible with the methods and articles described in U.S. patent application Ser. No. 12/535,328, filed Aug. 4, 2009, published as U.S. Publication No. 2010/0035128, and entitled "Application of Force In Electrochemical Cells", which is incorporated herein by reference in its entirety for all purposes. For instance, in some embodiments, an anisotropic force with a component normal to the active surface of the anode is applied, during at least one period of time during charge and/or discharge of the cell, to an extent effective to inhibit an increase in surface area of the anode active surface relative to an increase in surface area absent the anisotropic force. The component of the anisotropic force normal to the anode active surface may, for example, define a pressure of at least about 4.9, at least about 9.8, at least about 24.5, at least about 49, at least about 98, at least about 117.6, or at least about 147 Newtons per square centimeter. In some embodiments, the component of the anisotropic force normal to the anode active surface may, for example, define a pressure of less than about 196, less than about 147, less than about 117.6, less than about 98, less than about 49, less than about 24.5, or less than about 9.8 Newtons per square centimeter. In some cases, the component of the anisotropic force normal to the anode active surface is may define a pressure of between about 4.9 and about 147 Newtons per square centimeter, between about 49 and about 117.6 Newtons per square centimeter, or between about 68.6 and about 98 Newtons per square centimeter. While forces and pressures are generally described herein in units of Newtons and Newtons per unit area, respectively, forces and pressures can also be expressed in units of kilograms-force and kilograms-force per unit area, respectively. One or ordinary skill in the art will be familiar with kilogram-force-based units, and will understand that 1 kilogram-force is equivalent to about 9.8 Newtons.

As described herein, the adhesion promoter may include a formulation that can solvate, dissolve portions of, and/or activate a surface of a release layer to which the adhesion promoter formulation comes in contact to promote adhesion between the release layer and another component of the cell. In some embodiments, the adhesion promoter is relatively inert with respect to other components of the cell (e.g., current collector, electroactive material, electrolyte). In certain embodiments, the adhesion promoter may be formulated or applied (e.g., in a certain amount or by a particular method) such that penetration of the adhesion promoter through the release layer is minimized so that the adhesion promoter does not react with one or more components of the cell. The particular adhesion promoter formulation may be designed such that it can be easily applied to a component of the cell, e.g., by techniques such as coating, spraying painting, and other methods described herein and known to those of ordinary skill in the art.

In some embodiments, an adhesion promoter (e.g., an adhesive or a solvent solution) may include one or more of the materials that can be used to form the release layer. Typically, the adhesion promoter has a different formulation than that of the release layer; however, in some embodiments, the formulations may be substantially similar.

The release layer and/or an adhesion promoter may be formed of or include in its composition, for example, a metal, a ceramic, a polymer, or a combination thereof. As such, the release layer and/or adhesion promoter may be conductive, semi-conductive, or insulating.

In some embodiments, a release layer and/or an adhesion promoter comprises a polymeric material. In some cases, at least a portion of the polymeric material of the release layer and/or an adhesion promoter is crosslinked; in other cases, the polymeric material(s) is substantially uncrosslinked. When included in an adhesion promoter formulation, a polymer may act as an adhesive to promote adhesion between two components of an electrochemical cell.

At least a portion of a polymer is crosslinked when there are crosslinking bonds connecting two or more individual polymer chains to one another at at least one position not at a terminal end of one of the polymer chains. For instance, in cases in which a primer layer comprises a certain percentage by weight of a crosslinked polymeric material, that percentage by weight of the individual polymer chains within that layer may be linked at at least one intermediate (e.g., non-terminal) position along the polymer chain with another polymer chain within that layer. In some embodiments, crosslinking bonds are covalent bonds. In other embodiments, crosslinking bonds are ionic bonds. Together, crosslinked polymer chains create interconnected, three-dimensional polymer networks. Crosslinking bonds attaching independent polymer chains to one another may be generated by methods such as UV radiation, gamma-radiation, crosslinking agents, thermal stimulation, photochemical stimulation, electron beams, self-crosslinking, free radicals, and other methods known to one of ordinary skill in the art.

In some cases, a release layer and/or an adhesion promoter comprises less than 30% by weight of a crosslinked polymeric material (e.g., as determined after the primer layer has been dried). That is, less than 30% by weight of the individual polymer chains which form the polymeric material of a particular layer may be crosslinked at at least one intermediate (e.g., non-terminal) position along the chain with another individual polymer chain within that layer. A release layer and/or an adhesion promoter may include, for example, less than 25% by weight, less than 20% by weight, less than 15% by weight, less than 10% by weight, less than 5% by weight, or less than 2% by weight, or 0% of a crosslinked polymeric material. In certain embodiments, a release layer and/or an adhesion promoter includes less than 30% by weight of a covalently crosslinked polymeric material. For example, a release layer and/or an adhesion promoter may include less than 25% by weight, less than 20% by weight, less than 15% by weight, less than 10% by weight, less than 5% by weight, or less than 2% by weight, or 0% of a covalently crosslinked polymeric material. In one particular embodiment, a release layer and/or an adhesion promoter is essentially free of covalently crosslinked material.

Sometimes, a release layer has a different degree of crosslinking within the layer. For instance, a first surface of a release layer may include a lesser amount of a crosslinked polymer, and a second surface of the release layer may include higher amounts of crosslinked polymer. The amount of crosslinking may be in the form a gradient within the layer. Other arrangements are also possible.

In some embodiments, a release layer and/or an adhesion promoter comprises a substantially uncrosslinked polymeric material. As used herein, the term "substantially uncrosslinked" means that during normal processing of the polymeric material to form a release layer, an adhesion promoter, and/or to fabricate an electrochemical cell associated therewith, methods commonly known for inducing crosslinking in the polymeric material, such as exposure to ultraviolet (UV) radiation and addition of crosslinking agents, are not used. A substantially uncrosslinked material may be essentially free of crosslinked material to the extent that it has no greater degree of crosslinking than is inherent to the polymeric material. In some embodiments, a substantially uncrosslinked material is essentially free of crosslinked material to the extent that it has no greater degree of crosslinking than is inherent to the polymeric material after normal processing of the polymeric material to form the release layer, an adhesion promoter, and/or to fabricate an electrochemical cell associated therewith. Typically, a substantially uncrosslinked material has less than 10% by weight, less than 7% by weight, less than 5% by weight, less than 2% by weight, or less than 1% by weight of crosslinked polymeric material in its composition. In certain embodiments, a substantially uncrosslinked material has less than 10% by weight, less than 7% by weight, less than 5% by weight, less than 2% by weight, or less than 1% by weight of covalently crosslinked polymeric material in its composition.

Polymeric material may be crosslinked to varying degrees depending on the number of chains involved in at least one crosslinking bond. The percent by weight of crosslinked polymer out of a total mass of polymeric material may be determined by identifying the mass of polymers engaged in crosslinking bonds relative to the whole mass under consideration. Such a determination may be achieved by one of ordinary skill in the art by a variety of scientific methods including, for example, FTIR and differential scanning calorimetry (DCS).

It should be understood that while a release layer and/or an adhesion promoter may include a certain percentage of crosslinked polymeric material (e.g., less than 30% by weight of a crosslinked polymeric material), the total amount of polymeric material (e.g., combined crosslinked and non-crosslinked polymeric material) in the release layer and/or adhesion promoter may vary, e.g., from 20-100% by weight of the release layer and/or adhesion promoter (e.g., from 30-90 wt %, from 50-95 wt %, or from 70-100 wt %). The remaining material used to form the release layer and/or adhesion promoter may include, for example, a filler (e.g., conductive, semi-conductive, or insulating filler), a crosslinking agent, a surfactant, one or more solvents, other materials as described herein, and combinations thereof.

In certain embodiments, a release layer and/or an adhesion promoter includes a UV curable material. For instance, at least 30 wt %, at least 50 wt %, or at least 80 wt % of a release layer or a layer formed by an adhesion promoter may be a UV curable material. In other instances, at least 30 wt %, at least 50 wt %, or at least 80 wt % of a release layer or a layer formed by an adhesion promoter is a non-UV curable material. In one embodiment, substantially all of a release layer and/or a layer formed by an adhesion promoter is non-UV curable.

In some embodiments, a release layer and/or an adhesion promoter described herein comprises a material including pendant hydroxyl functional groups. Hydroxyl groups may provide the release layer with a relatively high adhesive affinity to a first layer but a relatively moderate or poor adhesive affinity to a second layer, or may allow an adhesion promoter to facilitate adhesion between a release layer and another component (e.g., between two release layers). Non-limiting examples of hydroxyl-containing polymers include poly vinyl alcohol (PVOH), polyvinyl butyral, polyvinyl formal, vinyl acetate-vinyl alcohol copolymers, ethylene-vinyl alcohol copolymers, and vinyl alcohol-methyl methacrylate copolymers. The hydroxyl-containing polymer may have varying levels of hydrolysis (thereby including varying amounts of hydroxyl groups). For instance, a polymer (e.g., a vinyl-based polymer) may be greater than 50% hydrolyzed, greater than 60% hydrolyzed, greater than 70% hydrolyzed, greater than 80% hydrolyzed, greater than 90% hydrolyzed, greater than 95% hydrolyzed, or greater than 99% hydrolyzed. A greater degree of hydrolysis may allow, for example, better adhesion of the hydroxyl-containing material to certain materials and, in some cases, may cause the polymer to be less soluble in the electrolyte. In other embodiments, a polymer having hydroxyl groups may be less than 50% hydrolyzed, less than 40% hydrolyzed, less than 30% hydrolyzed, less than 20% hydrolyzed, or less than 10% hydrolyzed with hydroxyl functional groups. In some cases, a release layer and/or an adhesion promoter is water soluble.

In some embodiments, a release layer and/or an adhesion promoter described herein comprises polyvinyl alcohol. The polyvinyl alcohol in a release layer and/or an adhesion promoter may be crosslinked in some instances, and substantially uncrosslinked in other instances. In one particular embodiment, a release layer immediately adjacent a carrier substrate comprises polyvinyl alcohol. In another embodiment, the release layer consists essentially of polyvinyl alcohol. The polyvinyl alcohol in such and other embodiments may be substantially uncrosslinked, or in other cases, less than 30% of the material used to form the first release layer is crosslinked. For instance, a release layer immediately adjacent a carrier substrate and including polyvinyl alcohol may comprise less than 30% by weight, less than 20% by weight, less than 15% by weight, less than 10% by weight, less than 5% by weight, or less than 2% by weight, of crosslinked polyvinyl alcohol. Such a release layer may optionally be adjacent a second release layer, which may have a different material composition than that of the first release layer.

Certain types of polymers are known to form crosslinking bonds under appropriate conditions. Non-limiting examples of crosslinkable polymers include: polyvinyl alcohol, polyvinylbutryl, polyvinylpyridyl, polyvinyl pyrrolidone, polyvinyl acetate, acrylonitrile butadiene styrene (ABS), ethylene-propylene rubbers (EPDM), EPR, chlorinated polyethylene (CPE), ethelynebisacrylamide (EBA), acrylates (e.g., alkyl acrylates, glycol acrylates, polyglycol acrylates, ethylene ethyl acrylate (EEA)), hydrogenated nitrile butadiene rubber (HNBR), natural rubber, nitrile butadiene rubber (NBR), certain fluoropolymers, silicone rubber, polyisoprene, ethylene vinyl acetate (EVA), chlorosulfonyl rubber, flourinated poly(arylene ether) (FPAE), polyether ketones, polysulfones, polyether imides, diepoxides, diisocyanates, diisothiocyanates, formaldehyde resins, amino resins, polyurethanes, unsaturated polyethers, polyglycol vinyl ethers, polyglycol divinyl ethers, copolymers thereof, and those described in U.S. Pat. No. 6,183,901 to Ying et al. of the common assignee for protective coating layers for separator layers. Those of ordinary skill in the art can choose appropriate polymers that can be crosslinked, as well as suitable methods of crosslinking, based upon general knowledge of the art in combination with the description herein.

Other classes of polymers that may be suitable for use in a release layer and/or an adhesion promoter (either crosslinked or non-crosslinked) include, but are not limited to, polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly (N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), polyvinylidene fluorides ($PVF_2$ or PVDF), poly(2-vinyl pyridine), polychlorotrifluoro ethylene, poly(isohexylcynaoacrylate), polyisobutylene, poly(methyl styrene), poly(methylmethacrylate) (PMMA), polyethylacrylate, polymethylmethacrylate, polyethylmethacrylate, UV curable acrylates or methacrylates); polyacetals; polyolefins (e.g., poly(butene-1), poly(n-pentene-2), polypropylene, polytetrafluoroethylene (Teflon)); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO), heat curable divinyl ethers); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene, ethylene-propylene-diene (EPDM) rubbers); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). The mechanical and physical properties (e.g., conductivity, resistivity) of these polymers are known. Accordingly, those of ordinary skill in the art can choose suitable polymers for use as release layers and/or for use in an adhesion promoter based on factors such as their mechanical and/or electronic properties, adhesive affinity to carrier substrates and/or components of a cell, and solubility in a particular solvent or electrolyte, and other factors described herein, by, for example, tailoring the amounts of components of polymer blends, adjusting the degree of cross-linking (if any), etc. Simple screening tests such as those described herein can be used to select polymers that have the physical/mechanical properties.

The molecular weight of a polymer may also affect adhesive affinity and can vary in a release layer and/or in an adhesion promoter. For example, the molecular weight of a polymer used in a release layer and/or an adhesion promoter may be between 1,000 g/mol and 5,000 g/mol, 5,000 g/mol and 10,000 g/mol, between 10,000 g/mol and 15,000 g/mol, between, 15,000 g/mol and 20,000 g/mol, between 20,000 g/mol and 30,000 g/mol, between 30,000 g/mol and 50,000 g/mol, between 50,000 g/mol and 100,000 g/mol, or between 100,000 g/mol and 200,000 g/mol. Other molecular weight ranges are also possible. In some embodiments, the molecular weight of a polymer used in a release layer and/or an adhesion promoter may be greater than about 1,000 g/mol, greater than about 5,000 g/mol, greater than about 10,000 g/mol, greater than about 15,000 g/mol, greater than about 20,000 g/mol, greater than about 25,000 g/mol, greater than about 30,000 g/mol, greater than about 50,000 g/mol, greater than about 100,000 g/mol or greater than about 150,000 g/mol. In other embodiments, the molecular weight of a polymer used in a release layer and/or an adhesion promoter may be less than about 150,000 g/mol, less than about 100,000 g/mol, less than about 50,000 g/mol, less than about 30,000 g/mol, less than about 25,000 g/mol, less than about 20,000 g/mol, less than less than about 10,000 g/mol, about 5,000 g/mol, or less than about 1,000 g/mol.

A release layer and/or an adhesion promoter may include one or more crosslinking agents. A crosslinking agent is a molecule with a reactive portion(s) designed to interact with functional groups on the polymer chains in a manner that will form a crosslinking bond between one or more polymer chains. Examples of crosslinking agents that can crosslink polymeric materials used for release layers and/or adhesion promoters described herein include, but are not limited to: polyamide-epichlorohydrin (polycup 172); aldehydes (e.g., formaldehyde and urea-formaldehyde); dialdehydes (e.g., glyoxal glutaraldehyde, and hydroxyadipaldehyde); acrylates (e.g., ethylene glycol diacrylate, di(ethylene glycol) diacrylate, tetra(ethylene glycol) diacrylate, methacrylates, ethelyne glycol dimethacrylate, di(ethylene glycol) dimethacrylate, tri(ethylene glycol) dimethacrylate); amides (e.g., N,N'-methylenebisacrylamide, N,N'-methylenebisacrylamide, N,N'-(1,2-dihydroxyethylene)bisacrylamide, N-(1-hydroxy-2,2-dimethoxyethyl)acrylamide); silanes (e.g., methyltrimethoxysilane, methyltriethoxysilane, tetramethoxysilane (TMOS), tetraethoxysilane (TEOS), tetrapropoxysilane, methyltris(methylethyldetoxime)silane, methyltris(acetoxime)silane, methyltris(methylisobutylketoxime)silane, dimethyldi(methylethyldetoxime)silane, trimethyl(methylethylketoxime)silane, vinyltris(methylethylketoxime)silane, methylvinyldi(methylethylketoxime)silane, methylvinyldi(cyclohexaneoneoxxime)silane, vinyltris(methylisobutylketoxime)silane, methyltriacetoxysilane, tetraacetoxysilane, and phenyltris(methylethylketoxime)silane); divinylbenzene; melamine; zirconium ammonium carbonate; dicyclohexylcarbodiimide/dimethylaminopyridine (DCC/DMAP); 2-chloropyridinium ion; 1-hydroxycyclohexylphenyl ketone; acetophenon dimethylketal; benzoylmethyl ether; aryl trifluorovinyl ethers; benzocyclobutenes; phenolic resins (e.g., condensates of phenol with formaldehyde and lower alcohols, such as methanol, ethanol, butanol, and isobutanol), epoxides; melamine resins (e.g., condensates of melamine with formaldehyde and lower alcohols, such as methanol, ethanol, butanol, and isobutanol); polyisocyanates; dialdehydes; and other crosslinking agents known to those of ordinary skill in the art.

In embodiments including a crosslinked polymeric material and a crosslinking agent, the weight ratio of the polymeric material to the crosslinking agent may vary for a variety of reasons including, but not limited to, the functional-group content of the polymer, its molecular weight, the reactivity and functionality of the crosslinking agent, the desired rate of crosslinking, the degree of stiffness/hardness desired in the polymeric material, and the temperature at which the crosslinking reaction may occur. Non-limiting examples of ranges of weight ratios between the polymeric material and the crosslinking agent include from 100:1 to 50:1, from 20:1 to 1:1, from 10:1 to 2:1, and from 8:1 to 4:1.

In other embodiments, a release layer and/or an adhesion promoter comprises a conductive material such as a metal or a conductive polymer. For example, if the release layer also acts as a current collector after being incorporated into the electrochemical cell, the release layer may be formed of a material suitable for use as a current collector, as described in more detail below.

A release layer and/or an adhesion promoter may include one or more solvents, e.g., in its initial formulation when being applied to a component of an electrochemical cell. The particular solvent or solvent combination used may depend on, for example, the type and amounts of any other materials in the formulation, the method of applying the formulation to the cell component, the inertness of the solvent with respect to other components of the electrochemical cell (e.g., current collector, electroactive material, electrolyte). For example, a particular solvent or solvent combination may be chosen based in part on it's ability to solvate or dissolve any other materials (e.g., a polymer, filler, etc.) in the formulation. For adhesion promoter formulations, the particular solvent or solvent combination may be chosen based in part on it's ability to solvate or dissolve portions of a release layer to which the adhesion promoter formulation comes in contact, and/or its ability to activate a surface of the release layer to promote adhesion. In some cases, one or more solvents used can wet (and activate) a surface of a release layer to promote adhesion, but does not penetrate across the release layer. A combination of such and other factors may be taken into consideration when choosing appropriate solvents.

Non-limiting examples of suitable solvents may include aqueous liquids, non-aqueous liquids, and mixtures thereof. In some embodiments, solvents that may be used for a release layer and/or a adhesion promoter include, for example, water, methanol, ethanol, isopropanol, propanol, butanol, tetrahydrofuran, dimethoxyethane, acetone, toluene, xylene, acetonitrile, cyclohexane, and mixtures thereof can be used. Additional examples of non-aqueous liquid solvents include, but are not limited to, N-methyl acetamide, acetonitrile, acetals, ketals, esters, carbonates, sulfones, sulfites, sulfolanes, sulfoxides, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are may also be used. Of course, other suitable solvents can also be used as needed.

In one set of embodiments involving the use of a solvent combination for an adhesion promoter, a first solvent of the solvent combination may be used to solvate, dissolve, and/or activate portions of a release layer to which the adhesion promoter formulation comes in contact, and a second solvent may be used to dilute or decrease the viscosity of the adhesion promoter formulation. For example, in one particular set of embodiments, an adhesion promoter, which may be used to facilitate adhesion between two release layers comprising a polymer including pendant hydroxyl functional groups (e.g., PVOH), may include a first solvent that solvates, dissolves, or activates the pendant hydroxyl functional groups to promote adhesion between the release layers. The first solvent may be, for example, a sulfoxide or any other suitable solvent that can dissolve, solvate, or activate a polymer including pendant hydroxyl functional groups (e.g., PVOH). The adhesion promoter may further include a second solvent that is miscible with the first solvent. The second solvent may, for example, be used to dilute or decrease the viscosity of the adhesion promoter formulation and/or increase the vapor pressure of the adhesion promoter formulation. Additional solvents (e.g., third, fourth solvents) may also be included in the solvent combination. As described herein, one or more of the solvents of the solvent combination may be inert with respect to other components of the cell (e.g., current collector, electroactive material, electrolyte).

A solvent combination including a first solvent that may be used to solvate, dissolve, and/or activate portions of a release layer to which the adhesion promoter formulation comes in contact, and at least a second solvent (such as one having the properties described above), may include an amount of the first solvent of greater than about 1 wt %, greater than about 5 wt %, greater than about 10 wt %, greater than about 20 wt %, greater than about 30 wt %, greater than about 40 wt %, greater than about 50 wt %, greater than about 60 wt %, greater than about 70 wt %, greater than about 80 wt %, or greater than about 90 wt % with respect to the total solvent combination. In other embodiments, the first solvent is present at an amount of less than about 90 wt %, less than about 80 wt %, less than about 70 wt %, less than about 60 wt %, less than about 50 wt %, less than about 40 wt %, less than about 30 wt %, less than about 20 wt %, less than about 10 wt %, less than about 5 wt %, less than about 3 wt %, or less than about 1 wt % with respect to the total solvent combination.

As described herein, an adhesion promoter may include in its formulation one or more solvents that can be used to facilitate adhesion between two components (e.g., release layers) of an electrochemical cell. In some cases, the adhesion promoter includes in its formulation a solvent or solvent combination without any polymer. In other embodiments, the adhesion promoter includes in its formulation a solvent or solvent combination along with a polymer, such as those described herein, that may act as an adhesive. The amount of polymer in the adhesion promoter formulation that is applied to a component of an electrochemical cell may be, for example, less than or equal to about 20 wt %, less than or equal to about 15 wt %, less than or equal to about 10 wt %, less than or equal to about 7 wt %, less than or equal to about 5 wt %, less than or equal to about 4 wt %, less than or equal to about 3 wt %, less than or equal to about 2 wt %, less than or equal to about 1 wt %, less than or equal to about 0.5%, or less than or equal to about 0.1% with respect to the total weight of the adhesion promoter formulation.

The use of a polymer in an adhesion promoter formulation may, in some instances, decrease the time required to promote adhesion between components of the cell compared to using a similar adhesion promoter formulation but without the polymer, all other conditions being equal. For instance, adhesion using an adhesion promoter that includes a polymer may take place at least 2 times, 3 times, 4 times, 5 times, or 10 times faster than adhesion using an adhesion promoter that does not includes the polymer. The use of an adhesion promoter formulation without a polymer, however, may simplify the adhesion process.

The thickness of a release layer and/or a layer formed by an adhesion promoter (if a layer is formed at all) may vary over a range of thicknesses. Typically, the thickness of a release layer is greater than the thickness of a layer formed by an adhesion promoter. The thickness of a release layer may vary, for example, from about 0.1 microns to about 50 microns, and the thickness of a layer formed by an adhesion promoter may vary, for example, from about 0.001 microns to about 50 microns. In some cases, an adhesion promoter is applied but does not result in the formation of a layer having any appreciable thickness.

In some embodiments, the thickness of the release layer and/or adhesion promoter layer may be between 0.001-1 microns thick, between 0.001-3 microns thick, between 0.01-3 microns thick, between 0.01-5 microns thick, between 0.1-1 microns thick, between 0.1 and 2 microns thick, between 0.1 and 3 microns thick, between 1-5 microns thick, between 5-10 microns thick, between 5-20 microns thick, or between 10-50 microns thick. In certain embodiments, the thickness of a release layer and/or a layer formed by an adhesion promoter is, e.g., about 10 microns or less, about 7 microns or less, about 5 microns or less, about 3 microns or less, about 2.5 microns or less, about 2 microns or less, about 1.5 microns or less, about 1 micron or less, or about 0.5 microns or less. As noted above, a relatively thicker release layer may be suitable for applications where the release layer is not incorporated into an electrochemical cell (e.g., it is released along with a carrier substrate), and a relatively thinner release layer may be desirable where the release layer is incorporated into the electrochemical cell.

The inventors have discovered within the context of the invention that certain release layers can provide relatively good adhesion to a first surface (e.g., a carrier substrate) and relatively poor adhesion to a second surface (e.g., a current collector) by modifying the composition of one or more of the layers during processing. In one embodiment, this is achieved by including one or more components (e.g., a surfactant and/or a filler) in the release layer that interact favorably with the first surface to be adhered to promote adhesion, and interacts poorly to the second surface to promote release.

In one set of embodiments, a release layer (and/or an adhesion promoter) includes a surfactant. The surfactant may be, for example, an anionic surfactant, a cationic surfactant, a non-ionic surfactant, or a zwitterionic surfactant. Non-limiting examples of anionic surfactants include perfluorooctanoate, perfluorooctanesulfonate, sodium dodecyl sulfate, ammonium lauryl sulfate, and other alkyl sulfate salts, sodium laureth sulfate, alkyl benzene sulfonate, other soaps or fatty acid salts, and derivatives thereof. Non-limiting examples of cationic surfactants include cetyl trimethylammonium bromide and other alkyltrimethylammonium salts, cetylpyridinium chloridem, polyethoxylated tallow amine, benzalkonium chloride, benzethonium chloride, and derivatives thereof. Non-limiting examples of non-ionic surfactants include alkyl poly(ethylene oxide)

(e.g., 4-(1,1,3,3-tetramethylbutyl)phenyl-polyethylene glycol, t-octylphenoxypolythoxyethanol, polyethylene glycol tert-octylphenyl ether), alkylphenol poly(ethylene oxide), copolymers of poly(ethylene oxide) and poly(propylene oxide), alkyl polyglucosides (e.g., octyl glucoside and decyl maltoside), fatty alcohols (e.g., cetyl alcohol and oleyl alcohol), cocamide MEA or DEA, polysorbates (e.g., Tween 20, Tween 80), dodecyl dimethylamine oxide, and derivatives thereof. Non-limiting examples of zwitterionic surfactants include dodecyl betaine, cocamidopropyl betaine, and coco ampho glycinate, and derivatives thereof.

The amount of surfactant in a release layer, if present, may be present in the range of, for example, 0.01-10% by weight of the release layer (e.g., as measured after an appropriate amount of solvent has been removed from the release layer and/or after the layer has been appropriately cured).

In some cases, conductive fillers may be added to the material used to form a release layer (and/or an adhesion promoter). Conductive fillers can increase the electrically conductive properties of the material of the release layer and may include, for example, conductive carbons such as carbon black (e.g., Vulcan XC72R carbon black, Printex Xe-2, or Akzo Nobel Ketjen EC-600 JD), graphite fibers, graphite fibrils, graphite powder (e.g., Fluka #50870), activated carbon fibers, carbon fabrics, non-activated carbon nanofibers. Other non-limiting examples of conductive fillers include metal coated glass particles, metal particles, metal fibers, nanoparticles, nanotubes, nanowires, metal flakes, metal powders, metal fibers, metal mesh.

In some embodiments, a conductive filler may include a conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers for certain embodiments are polypyrroles, polyanilines, and polyacetylenes. Other conductive materials known to those of ordinary skill in the art can also be used as conductive fillers.

A non-conductive or a semi-conductive filler (e.g., silica particles) can also be included in a release layer.

The amount of filler in a release layer, if present, may be present in the range of, for example, 5-10%, 10-90% or 20-80% by weight of the release layer (e.g., as measured after an appropriate amount of solvent has been removed from the release layer and/or after the layer has been appropriately cured). For instance, the release layer may include a conductive filler in the range of 20-40% by weight, 20-60% by weight, 40-80% by weight, 60-80% by weight of the release layer.

Additionally, where the release layer is in contact with an electroactive material layer, the electroactive material layer may include certain chemical compositions that interact favorably with the release layer and which remain in the electroactive material layer even after drying. For example, the electroactive material layer may include a polymeric material (e.g., a binder) or other material containing certain functional groups (e.g., hydroxyl or ether groups) that can interact with those of the release layer. In one particular embodiment, both the electroactive material layer and the release layer include one or more polymers that can crosslink with each other. The release layer may be prepared such that it has a relatively high amount (e.g., an excess) of crosslinking agent. Upon positioning of the slurry containing the electroactive material adjacent the release layer, crosslinking agent at the interface of the two layers can cause crosslinking between a polymer in the electroactive material layer and a polymer in the release layer.

In other embodiments, a release layer may be prepared such that it has a relatively high amount (e.g., an excess) of crosslinking agent, and upon positioning of an adhesion promoter adjacent the release layer, crosslinking agent at the interface of the two layers can cause crosslinking between a polymer in the adhesion promoter and a polymer in the release layer.

Determining suitable compositions, configurations (e.g., crosslinked or substantially uncrosslinked, degree of hydrolyzation) and dimensions of release layers and/or adhesion promoters can be carried out by those of ordinary skill in the art, without undue experimentation. As described herein, a release layer may be chosen based on, for example, its inertness in the electrolyte and whether the release layer is to be incorporated into the electrochemical cell. The particular materials used to form the release layer may depend on, for example, the material compositions of the layers to be positioned adjacent the release layer and its adhesive affinity to those layers, as well as the thicknesses and method(s) used to deposit each of the layers. The dimensions of the release layer may be chosen such that the electrochemical cell has a low overall weight, while providing suitable release properties during fabrication.

One simple screening test for choosing appropriate materials for a release layer may include forming the release layer and immersing the layer in an electrolyte and observing whether inhibitory or other destructive behavior (e.g., disintegration) occurs compared to that in a control system. The same can be done with other layers (e.g., one or more of the conductive support, electroactive material, an adhesion promoter, and/or another release layer) attached to the release layer. Another simple screening test may include forming an electrode including the one or more release layers and immersing the electrode in the electrolyte of the battery in the presence of the other battery components, discharging/charging the battery, and observing whether specific discharge capacity is higher or lower compared to a control system. A high discharge capacity may indicate no or minimal adverse reactions between the release layer and other components of the battery.

To test whether a release layer has adequate adhesion to one surface but relatively low adhesion to another surface to allow the release layer to be released, the adhesiveness or force required to remove a release layer from a unit area of a surface can be measured (e.g., in units of $N/m^2$). Adhesiveness can be measured using a tensile testing apparatus or another suitable apparatus. Such experiments can optionally be performed in the presence of a solvent (e.g., an electrolyte) or other components (e.g., fillers) to determine the influence of the solvent and/or components on adhesion. In some embodiments, mechanical testing of tensile strength or shear strength can be performed. For example, a release layer may be positioned on a first surface and opposite forces can be applied until the surfaces are no longer joined. The (absolute) tensile strength or shear strength is determined by measuring the maximum load under tensile or shear, respectively, divided by the interfacial area between the articles (e.g., the surface area of overlap between the articles). The normalized tensile strength or shear strength can be determined by dividing the tensile strength or shear strength, respectively, by the mass of the release layer applied to the articles. In one set of embodiments, a "T-peel test" is used. For example, a flexible article such as a piece of tape can be positioned on a surface of the release layer, and the tape can be pulled away from the surface of the other layer by lifting one edge and pulling that edge in a direction approximately perpendicular to the layer so that as the tape is being removed, it continually defines a strip bent at approximately 90 degrees to the point at which it diverges from the other layer. In other embodiments, relative adhesion between layers can be determined by positioning a release layer between two layers (e.g., between a carrier substrate and a current collector), and a force applied until the surfaces are no longer joined. In some such embodiments, a release layer that adheres to a first surface but releases from a second surface, without mechanical disintegration of the release layer, may be useful as a release layer for fabricating components of an electrochemical cell. The effectiveness of an adhesion promoter to facilitate adhesion between two surfaces can be tested using similar methods. Other simple tests are known and can be conducted by those of ordinary skill in the art.

The percent difference in adhesive strength between the release layer and the two surfaces in which the release layer is in contact may be calculated by taking the difference between the adhesive strengths at these two interfaces. For instance, for a release layer positioned between two layers (e.g., between a carrier substrate and a current collector), the adhesive strength of the release layer on the first layer (e.g., a carrier substrate) can be calculated, and the adhesive strength of the release layer on the second layer (e.g., a current collector) can be calculated. The smaller value can then be subtracted from the larger value, and this difference divided by the larger value to determine the percentage difference in adhesive strength between each of the two layers and the release layer. In some embodiments, this percent difference in adhesive strength is greater than about 20%, greater than about 30%, greater than about 40%, greater than about 50%, greater than about 60%, greater than about 70%, or greater than about 80%. The percentage difference in adhesive strength may be tailored by methods described herein, such as by choosing appropriate materials for each of the layers.

Adhesion and/or release between a release layer and components of an electrochemical cell (including a second release layer) may involve associations such as adsorption, absorption, Van der Waals interactions, hydrogen bonding, covalent bonding, ionic bonding, cross linking, electrostatic interactions, and combinations thereof. The type and degree of such interactions can also be tailored by methods described herein.

A release layer can be fabricated by any suitable method. In some embodiments, thermal evaporation, vacuum deposition, sputtering, jet vapor deposition, or laser ablation can be used to deposit a release layer on a surface.

In other embodiments, a release layer is fabricating by first forming a release layer formulation, and then positioning the release layer formulation on a surface by a suitable method. In some cases, the release layer formulation is in the form of a slurry. The slurry may include any suitable solvent that can at least partially dissolve or disperse the release layer material (e.g., a polymer). For example, a release layer predominately formed of a hydrophobic material may include an organic solvent in the slurry, whereas a release layer predominately formed of a hydrophilic material may include water in the slurry. In certain embodiments, the slurry can include other solvents in addition to, or in place of, water (e.g., other solvents that can form a hydrogen bond), which can result in favorable interactions with components of the release layer. For example, alcohols such as methanol, ethanol, butanol, or isopropanol can be used. In some cases, a release layer slurry includes at least 10 wt %, at least 15 wt %, at least 20 wt %, at least 20 wt %, at least 30 wt %, at least 40 wt %, or at least wt % of an alcohol. Other solvents such as organic acids, esters, glymes, and ethers can also be used alone or in combination with other solvents, in certain embodiments.

Mixing of the various components can be accomplished using any of a variety of methods known in the art so long as the desired dissolution, dispersion, or suspension of the components is obtained. Suitable methods of mixing include, but are not limited to, mechanical agitation, grinding, ultrasonication, ball milling, sand milling, and impingement milling.

Mixing of the various components can occur at various temperatures. For instance, the various components may be mixed at a temperature of greater than or equal to 25° C., greater than or equal to 50° C., greater than or equal to 70° C., or greater than or equal to 90° C. for a suitable amount of time to obtain a desired dissolution or dispersion of components. For example, in some instances, a polymer used for a release layer (e.g., polyvinyl alcohol) is mixed at a temperature of greater than or equal 70° C. or greater than or equal to 90° C. In other embodiments, various components such as a polymeric material and a solvent may be mixed at a temperature of less than or equal to 50° C., less than or equal to 70° C., or less than or equal to 90° C. for a suitable amount of time to obtain a desired dissolution or dispersion of components. Mixing at such and other temperatures may be performed until the polymer is dissolved and/or dispersed as desired. This solution/dispersion can optionally be mixed with other components of the release layer (e.g., a conductive filler, solvent, crosslinker, etc.), e.g., at a suitable temperature, to form a release layer slurry.

A release layer and/or an adhesion promoter may be positioned on a surface by any suitable method. In certain embodiments, a release layer and/or an adhesion promoter is positioned on a surface by slot die coating or reverse roll coating. In each of these methods, the release layer formulation can be delivered as a slurry to a surface such as a carrier substrate, which may then optionally undergo any number of curing, drying, and/or treatment steps, prior to lamination of the carrier/release/electrode into a single stack. Similarly, an adhesion promoter may be applied to a surface of a release layer which may then optionally undergo any number of curing, drying, and/or treatment steps, prior to lamination of the carrier/release/electrode into a single stack. In some embodiments, the thickness of the coating, mechanical integrity, and/or coating uniformity may be tailored by varying the parameters of the coating method used.

Several aspects of the coating method can be controlled to produce a suitable release layer. When coating a very thin release layer, the mechanical integrity is dependant on coating uniformity. Both particulate contamination and undesired precipitation from solution can lead to poor mechanical properties in the final release layer. To prevent these defects, several steps can be taken. For example, a method may involve keeping the surface to be coated with the release layer substantially free of static charging, which can affect the adhesion of the release layer to that surface, and can additionally attract unwanted particulate contaminants on the surface. Static charging can be reduced or eliminating by applying static strings to the substrate unwind, or controlling the electronic state of the coat rolls (e.g., attached to ground, floating, biased). A method can also be employed to prevent unwanted precipitation out of the coating solution, e.g., by employing continuous mixing to prevent coagulation. Other techniques are also known to those by ordinary skill in the art.

In one set of embodiments, slot die coating is used to form a release layer coating and/or an adhesion promoter coating on a surface. In slot die coating, a fluid is delivered by a pump to a die which in turn delivers the coating fluid to the desired substrate. The die will usually include three pieces: a top, a bottom, and an internal shim. Either the top or bottom may include a well or reservoir to hold fluid and spread it across the width of the die. The shim determines both the size of the gap between the top and bottom plates as well as defining the coating width.

Thickness of the coating in this case may depend mainly on three factors: the rate at which fluid is delivered to the die (pump speed), the speed at which the substrate is moving past the die lips (line speed), and the size of the gap in the die lips (slot height). Thickness will additionally depend on the inherent properties of the solution to be coated such as viscosity and percent solids.

The uniformity of the coating will be directly related to how well the internal manifold in the die distributes the fluid across the substrate. To control coating uniformity, several steps can be taken. For example, the shape of the reservoir can be adjusted to equalize pressure across the width of the die. The shape of internal shim can be adjusted to account for pressure variations due to the position of the fluid inlet. The internal shim thickness can also be adjusted to produce higher or lower pressure drops between the fluid inlet and the die lips. The pressure drop will determine the residence time of the fluid in the die and can be used to influence coating thickness and prevent problems such as dry out in the die.

In another set of embodiments, reverse roll coating is used to form a release layer coating and/or an adhesion promoter coating on a surface. In one embodiment, a three roll reverse roll coater fluid is picked up by a first roller (metering roller), transferred in a controlled fashion to a second roller (application roller), and then wiped off of the second roller by the substrate as it travels by. More rollers can be used employing a similar technique. The coating fluid is delivered to a reservoir by a pump; the metering roller is positioned so that it is partially submerged in the coating fluid when the pan is filled. As the metering roller spins the application roller is moved (or vice versa) so that fluid is transferred between the two.

The amount of fluid, and in turn the final coat thickness of the release layer and/or an adhesion promoter, is partially determined by the amount of fluid transferred to the application roller. The amount of fluid transfer can be affected by changing the gaps between the rollers or by applying a doctor blade at any point in the process. Coating thickness is also affected by line speed in a way similar to slot die coating. Coating uniformity in the case of reverse roll coating may depend mainly on the uniformity of the coat rolls and the doctor blade(s) if any are used.

It should be understood that the compositions and methods described herein may be used to form release layers and/or adhesion promoter layers for fabricating electrodes (e.g., anodes and cathodes), as well as other applications that would benefit from the use of a release layer.

As described herein, a release layer may be positioned on a carrier substrate to facilitate fabrication of component of an electrochemical cell. Any suitable material can be used as a carrier substrate. As described above, the material (and thickness) of a carrier substrate may be chosen at least in part due to its ability to withstand certain processing conditions such as high temperature. The substrate material may also be chosen at least in part based on its adhesive affinity to a release layer. In some cases, a carrier substrate is a polymeric material. Examples of suitable materials that can be used to form all or portions of a carrier substrate include certain of those described herein suitable as release layers, optionally with modified molecular weight, cross-linking density, and/or addition of additives or other components. In certain embodiments, a carrier substrate comprises polyethylene terephthalate (PET) or a polyester. In other cases, a carrier substrate comprises a metal or a ceramic material. A carrier substrate may also include additional components such as fillers, binders, and/or surfactants.

Additionally, a carrier substrate may have any suitable thickness. For instance, the thickness of a carrier substrate may about 5 microns or greater, about 15 microns or greater, about 25 microns or greater, about 50 microns or greater, about 75 microns or greater, about 100 microns or greater, about 200 microns or greater, about 500 microns or greater, or about 1 mm or greater. In some cases, the carrier substrate has a thickness that is equal to or greater than the thickness of the release layer. As described herein, a relatively thicker carrier substrate may be suitable for applications where the carrier substrate is not incorporated into an electrochemical cell (e.g., it is released through the use of a release layer during fabrication of the cell). In certain embodiments, the carrier substrate is incorporated into the electrochemical cell, and in some such instances it may be desirable to use a relatively thinner carrier substrate.

An electrochemical cell may include any suitable current collector. In some instances, the current collector is positioned immediately adjacent a release layer (e.g., on top of a release layer that has been positioned on a carrier substrate). The current collector may have good adhesion to the release layer where the release layer is designed to be a part of the final electrochemical cell, or the current collector may have poor adhesion to the release layer where the release layer is designed to be released along with a carrier substrate.

A current collector is useful in efficiently collecting the electrical current generated throughout an electrode and in providing an efficient surface for attachment of the electrical contacts leading to the external circuit. A wide range of current collectors are known in the art. Suitable current collectors may include, for example, metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein.

In some embodiments, the current collector includes one or more conductive metals such as aluminum, copper, chromium, stainless steel and nickel. For example, a current collector may include a copper metal layer. Optionally, another conductive metal layer, such as titanium may be positioned on the copper layer. The titanium may promote adhesion of the copper layer to another material, such as an electroactive material layer. Other current collectors may include, for example, expanded metals, metal mesh, metal grids, expanded metal grids, metal wool, woven carbon fabric, woven carbon mesh, non-woven carbon mesh, and carbon felt. Furthermore, a current collector may be electrochemically inactive. In other embodiments, however, a current collector may comprise an electroactive material. For example, a current collector may include a material which is used as an electroactive material layer (e.g., as an anode or a cathode such as those described herein).

A current collector may be positioned on a surface (e.g., a surface of a release layer) by any suitable method such as lamination, sputtering, and vapor deposition. In some cases, a current collector is provided as a commercially available sheet that is laminated with an electrochemical cell component. In other cases, a current collector is formed during fabrication of the electrode by depositing a conductive material on a suitable surface.

A current collector may have any suitable thickness. For instance, the thickness of a current collector may be, for example, between 0.1 and 0.5 microns thick, between 0.1 and 0.3 microns thick, between 0.1 and 2 microns thick, between 1-5 microns thick, between 5-10 microns thick, between 5-20 microns thick, or between 10-50 microns thick. In certain embodiments, the thickness of a current collector is, e.g., about 20 microns or less, about 12 microns or less, about 10 microns or less, about 7 microns or less, about 5 microns or less, about 3 microns or less, about 1 micron or less, about 0.5 micron or less, or about 0.3 micron or less. In some embodiments, the use of a release layer during fabrication of an electrode can allow the formation or use of a very thin current collector, which can reduce the overall weight of the cell, thereby increasing the cell's energy density.

In some embodiments, release layers described herein can be used to form a cathode. The release layer may adhere to one or more components of a cathode in the final electrochemical cell, or the release layer may be released along with a carrier substrate in some embodiments. Suitable electroactive materials for use as cathode active materials in the cathode of the electrochemical cells described herein include, but are not limited to, electroactive transition metal chalcogenides, electroactive conductive polymers, electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, carbon, iodine, silver chromate, silver oxide and vanadium pentoxide, vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al. of the common assignee, and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

In one embodiment, an electroactive sulfur-containing material of a cathode active layer comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The cathode active layers described herein may comprise from about 20% to about 100% (e.g., from about 40% to about 100%, from about 60% to about 100%, or from about 80% to about 100%) by weight of electroactive cathode materials (e.g., as measured after an appropriate amount of solvent has been removed from the cathode active layer and/or after the layer has been appropriately cured). In one embodiment, the amount of electroactive sulfur-containing material in the cathode active layer is in the range of 5-30% by weight of the cathode active layer. In another embodiment, the amount of electroactive sulfur-containing material in the cathode active layer is in the range of 20% to 90% by weight of the cathode active layer.

Non-limiting examples of suitable liquid media (e.g., solvents) for the preparation of cathodes (as well as release layers of electrodes described herein) include aqueous liquids, non-aqueous liquids, and mixtures thereof. In some embodiments, liquids such as, for example, water, methanol, ethanol, isopropanol, propanol, butanol, tetrahydrofuran, dimethoxyethane, acetone, toluene, xylene, acetonitrile, cyclohexane, and mixtures thereof can be used. Of course, other suitable solvents can also be used as needed.

Positive electrode layers may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode active layer.

In some embodiments, fabrication of a sulfur cathode comprises mixing together at least sulfur powder and a carbon black (such as Printex carbon black supplied by the Degussa Corporation) with an appropriate solvent (such as water and/or IPA). In some embodiments, a polymeric binder can be added. This mixture may undergo one or more milling or grinding operations to yield a slurry with the desired particle size distribution and viscosity. The desired particle size and viscosity will depend on the intended properties of the final coating (thickness, density, pore sizes), the type of coating method employed, and the type of drying employed. Each component in the slurry may undergo some, all, or none of the grinding and milling operations in order to control the specific characteristics of that component. Additionally, each component may or may not undergo any milling or grinding operations prior to being combined with a solvent. Once the slurry is prepared, it can be applied to a substrate using any appropriate coating technique. After being applied to the substrate, the slurry can be dried before being incorporated into the cell. The cathode may be dried until all of the solvent has been driven off, or the cathode may be left with a significant portion of the solvent left in the cathode.

Electroactive layers such as cathode active layers may be deposited by any of a variety of methods generally known in the art, and optionally dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Polymer layers can also be spin-coated onto a surface. Web coating can also be employed. If removal of some or all of the solvent/liquid from a mixture is desired, this can be accomplished by any of a variety of methods known in the art. Examples of suitable methods for the removal of solvents from the mixture include, but are not limited to, hot air convection, heat, infrared radiation, residence time in ovens, flowing gases, vacuum, reduced pressure, extraction, and by simply air drying. Certain release layers may also be formed by such methods.

Drying and/or crosslinking may be performed at a range of temperatures. Suitable temperatures include those above which the liquid medium becomes volatile, typically above the boiling point, and also those at which the crosslinking reaction between appropriate groups and the crosslinking agent occurs at an acceptable rate. Suitable temperatures are also below those at which the current collector, for example, a metallized plastic film, may be deformed or damaged. In some embodiments, the drying and/or crosslinking step is performed at a temperature of from about 60-170° C.

Any negative electrode material suitable as an anode active layer may benefit from certain embodiments of the invention. Examples of suitable negative electrode materials for anode active layers include, but are not limited to, alkali-based materials such as lithium metal and lithium ion. Lithium metal anodes may be formed from lithium sources such as lithium foil, lithium deposited onto a conductive substrate, and lithium alloys (e.g., lithium-aluminum alloys and lithium-tin alloys). An anode active layer may consist essentially of lithium in certain embodiments. In some cases, the anodes described in U.S. patent application Ser. No. 11/821,576, filed Jun. 22, 2007, entitled "Lithium Alloy/ Sulfur Batteries", which is incorporated herein by reference in its entirety, are combined with embodiments of the present invention. It should be understood that other cell chemistries may also be used, such as zinc and copper anodes, and that other types of batteries can benefit from the methods and articles described herein.

Methods for depositing a negative electrode material (e.g., an alkali metal anode such as lithium) onto a surface (e.g., a surface of a current collector or a release layer) may include methods such as thermal evaporation (e.g., vacuum deposition), sputtering, jet vapor deposition, and laser ablation. Alternatively, where the anode comprises a lithium foil, or a lithium foil and a surface, these can be laminated together by a lamination process as known in the art to form an anode.

In certain embodiments, the negative electrode material layer(s) has a low surface roughness, e.g., a root mean square (RMS) surface roughness of less than about 1 micron, less than about 500 nm, less than about 100 nm, less than about 50 nm, less than about 25 nm, less than about 10 nm, less than about 5 nm, less than about 1 nm, or less than about 0.5 nm. Smooth negative electrode material layers can be achieved, in some embodiments, by controlling vacuum deposition of the negative electrode material. The negative electrode material may be deposited onto a smooth surface (e.g., a smooth current collector layer) having the same or a similar RMS surface roughness as the desired negative electrode material layer. Such and other methods can produce negative electrode material layer(s) that are at least 1.5×, 2×, 3×, 4×, 5×, or even 10× smoother than certain commercially-available foils, resulting in substantially uniformly-smooth surfaces.

Positive and/or negative electrodes may optionally include one or more layers that interact favorably with a suitable electrolyte, such as those described in International Patent Apl. Serial No. PCT/US2007/024805, filed Dec. 4, 2007 and entitled "Separation of Electrolytes", by Mikhaylik et al., which is incorporated herein by reference in its entirety for all purposes.

Furthermore, an electrochemical cell may have more than one electroactive material layer in some embodiments. For example, a first electroactive layer material may be separated from a second electroactive material layer by a stabilization layer, as described in more detail in U.S. patent application Ser. No. 11/400,781, filed Apr. 6, 2006, published as U.S. Patent Publication No. 2007/0221265, entitled, "Rechargeable Lithium/Water, Lithium/Air Batteries" to Affinito et al., which is incorporated herein by reference in its entirety.

An electroactive material layer (e.g., used as an anode or cathode) may have any suitable thickness. For instance, the thickness of the electroactive material layer may vary from, e.g., about 2 to 200 microns. For instance, the electroactive material layer may have a thickness of about 200 microns or less, about 100 microns or less, about 50 microns or less, about 35 microns or less, about 25 microns or less, about 15 microns or less, about 10 microns or less, or about 5 microns or less. In other instances, the electroactive material layer has a thickness of about 5 microns or greater, about 15 microns or greater, about 25 microns or greater, about 50 microns or greater, or about 100 microns or greater. The choice of thickness may depend on cell design parameters such as the cycle life of the cell desired. In some embodiments, the thickness of the electroactive material layer is in the range of about 2 to 100 microns (e.g., in the range of about 5 to 50 microns, in the range of about 2-10 microns, in the range of about 5 to 25 microns, or in the range of about 10 to 25 microns).

In certain embodiments where the anode includes more than one anode active layer (e.g., multiple vapor-deposited lithium metal layers interspersed between one or more anode stabilization layers), each of such anode active layers may be relatively thin, e.g., between 2-5 microns thick and/or between 8-15 microns thick. In one set of embodiments, an anode includes at least first and second anode active layers, the first anode active layer being adjacent a current collector, and the second anode active layer being closer in distance to an electrolyte than the first layer, and being separated from the first layer by one or more intervening layers (e.g., a polymer layer, a single-ion conductive layer, a ceramic layer). In some instances, the first anode active layer is thicker than the second anode active layer. In other instances, the second anode active layer is thicker than the first anode active layer. The thicknesses of such layers may vary in thickness and may have, for example, a range of thickness as described above.

Advantageously, certain electrochemical cells formed at least in part by one or more methods described herein may have a relatively thin or light anode active layer with respect to the thickness and/or weight of the cell. Even though a relatively thinner or lighter anode active layer is used, an electrochemical cell incorporating such a component may achieve a similar or even higher energy density compared to cells having similar components but having a thicker anode active layer. Prior to the invention, one of ordinary skill in the art may have used a relatively thicker anode active layer to compensate for factors that reduce the capacity of the cell during cycling such as decomposition of the anode active material, the formation of through-holes in the anode active layer(s) which propagate defects in the layer, the consumption of the anode active material and/or the solvent, and/or the formation of dendrites. That is, one may have included a thicker anode active layer knowing that not all of the anode active material would be consumed during the life of the cell due to one or more of the issues described above. The methods described herein, however, can allow one to incorporate a targeted amount of anode active material in an electrochemical cell to better match the requirements or capacity of the cathode, and/or to achieve a specific energy density target, while reducing excessive waste of anode active material.

For instance, in certain embodiments, depositing a relatively thin and smooth current collector (e.g., via use of a release layer) can allow the deposition of a thin and smooth anode active layer. The smooth current collector can provide a conductive surface to re-plate lithium and promote smooth lithium morphology at high lithium depth of discharge (DoD). This can reduce or eliminate the formation of through-holes and/or other defects in the layer during charge or discharge, e.g., by reducing random current variations which may increase roughness with each cycle. As a result, a higher proportion of the anode active layer can be used in generating energy during cycling of the cell compared to a cell made without such and other processes.

In certain embodiments, an electrochemical cell described herein includes a relatively thin anode active material (e.g., in the form of one or more layers having a combined thickness of about 50 microns or less, about 40 microns or less, about 30 microns or less, about 20 microns or less, about 15 microns or less, about 10 microns or less, or about 5 microns or less) and a relatively thick battery (e.g., a thickness of about 10 microns or greater, about 50 microns or greater, about 100 microns or greater, about 200 microns or greater, about 500 microns or greater, about 1 mm or greater, or about 2 mm or greater). In certain embodiments, the thickness of an electrochemical cell is between about 25 microns and about 75 microns thick, between about 50 to about 100 microns thick, or between about 75 microns to about 150 microns thick. The thickness of the cell can be measured from the outer surface of the anode, i.e., the surface of the anode most distant from the cathode (including any layer(s) supporting and/or adjacent the anode active material, such as a current collector or release layer) to the outer surface of the cathode i.e., the surface of the cathode most distant from the anode (including any layer(s) supporting and/or adjacent the cathode active material, such as a current collector or release layer), or in the case of stacked cells or cells in a rolled configuration, thickness can be determined by measuring the distance between repeat units of the cell (e.g., the shortest distance between a first cathode and a second cathode). In some cases, the thickness of the one or more anode active layers is less than 50%, 40%, 30%, 25%, 20%, 15%, 10%, or 5% the thickness of the cell. Optionally, such and other electrochemical cells described herein may include an anode active material adjacent a relatively thin current collector having a thickness provided above. The electrochemical cell may optionally include a thin release layer, and in some cases does not include a substrate (e.g., the electrochemical cell may be self-supporting).

Such and other electrochemical cells described herein may have an energy density (which can be expressed as Watt hours per kilogram (Wh/kg) or energy per size, as expressed as Watt hours per liter (Wh/l)) of, for example, at least 200 Wh/kg (or Wh/l), at least 250 Wh/kg (or Wh/l), at least 300 Wh/kg (or Wh/l), at least 350 Wh/kg (or Wh/l), at least 400 Wh/kg (or Wh/l), at least 450 Wh/kg (or Wh/l), or at least 500 Wh/kg (or Wh/l). In some cases, such and other energy densities are achieved at or after the cell's $15^{th}$, $25^{th}$, $30^{th}$, $40^{th}$, $45^{th}$, $50^{th}$, or $60^{th}$ discharge. It is to be understood that "at or after $X^{th}$ discharge" means a time or times at or after a point where a rechargeable electrochemical device has been charged and discharged at least X times, where charge means essentially full charge, and discharge means, on average of all discharges, at least 75% discharge. In some cases, such and other electrochemical cells described herein have a discharge capacity of at least 1000, 1200, 1600, or 1800 mAh at the end of the battery's $15^{th}$, $25^{th}$, $30^{th}$, $40^{th}$, $45^{th}$, $50^{th}$, or $60^{th}$ cycle. Furthermore, the electrochemical cell may be designed to cycle at least 25, at least 50, at least 100, at least 200, or at least 500 times while maintaining, by the end of this cycling, at least half of the maximum achievable discharge capacity of the cell. In one particular embodiment, an electrochemical cell made by processes described herein including a 10-micron-thick lithium active layer has a dense/smooth lithium surface from cycle 100 through cycle 350 at 100% Li depth of discharge.

An electrochemical cell described herein may include any suitable electrolyte. The electrolytes used in electrochemical cells described herein can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material is electrochemically and chemically unreactive with respect to the anode and the cathode, and the material facilitates the transport of ions (e.g., lithium ions) between the anode and the cathode. The electrolyte may be electronically non-conductive to prevent short circuiting between the anode and the cathode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in International Patent Apl. Serial No. PCT/US2007/024805, filed Dec. 4, 2007, published as International Publication No. WO2008/070059, and entitled "Separation of Electrolytes", by Mikhaylik et al.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode.

A separator or a solid or gel electrolyte may have any suitable thickness. For instance, a separator or an electrolyte may have a thickness in the range of about 2 to about 100 microns (e.g., in the range of about 5 to about 50 microns, in the range of about 2 to about 10 microns, in the range of about 5 to about 25 microns, or in the range of about 10 to about 25 microns). In some cases, the distance between the outermost surface of the anode facing the electrolyte and the outermost surface of the cathode facing the electrolyte has such a thickness.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al. In certain embodiments, a separator is formed by using a release layer described herein.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

The figures that accompany this disclosure are schematic only, and illustrate a substantially flat battery arrangement. It should be understood that any electrochemical cell arrangement can be constructed, employing the principles of the present invention, in any configuration. For example, with reference to FIGS. 1A and 2B, electrode 12 may be covered on the side opposite the side at which components 26 and 28 are illustrated with a similar or identical set of components 26 and/or 28. In this arrangement, a substantially mirror-image structure is created with a mirror plane passing through electrode 12. This would be the case, for example, in a "rolled" battery configuration in which a layer of electrode 12 is surrounded on each side by structures 26 and/or 28 (or, in alternative arrangements layered structures illustrated in other figures herein). On the outside of each protective structure of the anode an electrolyte is provided and, opposite the electrolyte, an opposite electrode (e.g., an anode in the case of electrode 12 being a cathode). In a rolled arrangement, or other arrangement including multiple layers of alternating anode and cathode functionality, the structure involves anode, electrolyte, cathode, electrolyte, anode, etc., where each anode can include anode stabilization structures as described in any part of this disclosure, or in more detail in U.S. patent application Ser. No. 11/400,025, filed Apr. 6, 2006, published as U.S. Publication No. 2007/0224502, and entitled, "Electrode Protection in both Aqueous and Non-Aqueous Electrochemical Cells, including Rechargeable Lithium Batteries," to Affinito et al., which is incorporated herein by reference in its entirety. Of course, at the outer boundaries of such an assembly, a "terminal" anode or cathode will be present. Circuitry to interconnect such a layered or rolled structure is well-known in the art.

The following examples are intended to illustrate certain embodiments of the present invention, but are not to be construed as limiting and do not exemplify the full scope of the invention. The following materials were used as received in the Examples below: Celvol 425 (polyvinyl alcohol, 96.0% hydrolyzed) from Celanese Corporation; Celvol 325 from Celanese Corporation.

Example 1

This example describes a process for forming a release layer, and a process for fabricating an anode of an electrochemical cell using the release layer.

In a 5 L 3-necked flask equipped with a mechanical stirrer, condenser, and a thermometer, 28.3% by weight isopropyl alcohol (IPA) was added and stirred at room temperature. To this, 5.5% by weight of Celvol 425 (from Celanese Corp.) polyvinyl alcohol (PVOH) was added, with continued stirring. To this suspension, 66.2% by weight distilled water was added. The resulting suspension was heated to a temperature between 65° C. to 75° C. until all PVOH pellets were dissolved completely. The suspension was stirred continuously for an additional hour at this temperature. The stirring solution was allowed to cool to room temperature slowly. Once cooled, the PVOH formulation was tested for percent solids, density, and viscosity. The cooled PVOH formulation was then filtered into a secondary container to remove any particulate contaminants. The resulting mixture was coated onto a 76-micron-thick PET film, which was used as a carrier substrate, on a Liberty Coater. The web speed, pump speed and heating temperature were 4 ft/min, 20 ft/min and 70-114° C. respectively. At this temperature, the solvent evaporated from the release layer.

After coating, the PVOH release layer could be easily delaminated from the PET substrate without brakeage. The thickness of the released PVOH layer was 3 microns.

To fabricate an anode, a 2-micron-thick PVOH release layer was formed on the surface of a 100 ft sample of PET carrier substrate. A current collector was formed by vacuum depositing copper and titanium on the release layer in an Alamo machine. A lithium metal layer was then deposited on top of the current collector. The combined thickness of the current collector and lithium metal layer was ~25 microns. The metalized anode release system was delaminated from the PET carrier substrate without brakeage, with the release layer remaining on the copper current collector. The resulting structure can be used as anode in a Li/S or other battery.

This example illustrates a method for fabricating an anode of an electrochemical cell by depositing a current collector and an electroactive material layer on a release layer positioned on a carrier substrate using the process described above. The release layer, which was formed by dissolving 96% hydrolyzed PVOH polymer in an alcohol/water solution and then heating slowly until 65° C. to 75° C., resulted in a layer having a relatively high adhesive affinity to the copper current collector and a relatively low adhesive affinity to the PET carrier substrate. As such, the release layer, along with the electrode assembly, could be easily delaminated from the PET substrate without mechanical disintegration.

Comparative Example 1

In a 5 L flask equipped with a magnetic stir bar, 96.5 wt % distilled water was added and stirred at room temperature. The solution was heated to a temperature between 70° C. and 75° C. At this temperature, all 3.5% by weight of PVOH (Celvol 325 from Celanese Corp.) was quickly added at once, and the resulting suspension was stirred continuously and heated until reaching a temperature of 95° C. The stirring solution was allowed to cool to room temperature slowly. After cooling, the solution of 3.5 wt % PVOH in 96.5 wt % of deionized water was coated onto 76-micron-thick PET film, which was used as a carrier substrate, on a web coater. The web speed, pump speed and heating zone temperature during coating were 4 ft/min, 16 ft/min and 70-114° C. respectively. At this temperature, the solvent evaporated from the release layer.

After drying, the resulting PVOH film had a strong adhesion to the PET carrier substrate and was easily broken during delamination. After the deposition of the copper and titanium layers on the PVOH film, and then the deposition of a lithium metal layer (as in Example 1), the anode release system could not be delaminated due to the high adhesion between PVOH and PET.

This comparative example illustrates that certain processes for forming release layers do not result in adequate release layers useful for fabricating an anode of an electrochemical cell. In this example, the release layer, which was formed by dissolving 96% hydrolyzed PVOH polymer in a water solution and then heating until 95° C., resulted in a layer having a relatively high adhesive affinity to the copper current collector and a relatively high adhesive affinity to the PET carrier substrate. As such, the release layer could not be delaminated from the PET substrate without mechanical disintegration.

Example 2

This example describes a process for forming a release layer, and a process for fabricating an anode of an electrochemical cell using the release layer.

In a 5 L 3-necked flask equipped with a mechanical stirrer, condenser, and a thermometer, 27.7 wt % isopropyl alcohol (IPA) was added and stirred at room temperature. To this solution was added 7.5% by weight of Celvol 310 (from Celanese Corp.) polyvinyl alcohol (PVOH) with continued stirring. To this suspension, 64.8 wt % distilled water was added. The suspension was heated until it reached a temperature of between 65° C. and 75° C., and until all PVOH pellets had dissolved completely. The solution was stirred continuously for an additional hour at this temperature. The stirring solution was allowed to cool to room temperature slowly. Once cooled, the release formulation was tested for percent solids, density, and viscosity. The cooled formulation was then filtered into a secondary container to remove any particulate contaminants. The resulting mixture was coated onto a 76 micron PET film, used as a carrier substrate, on a Liberty Coater. The web speed, pump speed and heating temperature during coating were 4 ft/min, 23 ft/min and 70-114° C. respectively. At this temperature, the solvent evaporated from the release layer.

After coating, the PVOH release layer could be easily delaminated from the PET substrate without brakeage. The thickness of the released PVOH layer was 3 microns.

To fabricate an anode, a 2-micron-thick PVOH release layer was formed on the surface of a 100 ft sample of PET carrier substrate using the process described above. A current collector was formed by vacuum depositing copper and titanium on the release layer in an Alamo machine. A lithium metal layer was then deposited on top of the current collector. The combined thickness of the current collector and lithium metal layer was ~25 microns. The metalized anode release system was delaminated from the PET carrier substrate without brakeage, with the release layer remaining on the copper current collector. The resulting structure can be used as anode in a Li/S or other battery.

This example illustrates a method for fabricating an anode of an electrochemical cell by depositing a current collector and an electroactive material layer on a release layer positioned on a carrier substrate. The release layer, which was formed by dissolving hydrolyzed PVOH polymer in an alcohol/water solution and then heating slowly until 65° C. to 75° C., resulted in a layer having a relatively high adhesive affinity to the copper current collector and a relatively low adhesive affinity to the PET carrier substrate. As such, the release layer, along with the electrode assembly, could be easily delaminated from the PET substrate without mechanical disintegration.

Comparative Example 2

In a 5 L flask equipped with a magnetic stir bar, 93.5 wt % distilled water was added and stirred at room temperature. The solution was heated to a temperature between 70° C. and 75° C. At this temperature, 3.5% by weight of PVOH (Celvol 325 from Celanese Corp.) was slowly added. The suspension was heated until 90° C. to dissolve the PVOH. An additional 3 wt % PVOH (Celvol 325 from Celanese Corp.) was then added to the solution. After cooling, the solution of 6.5 wt % PVOH in 93.5 wt % of deionized water was coated onto 76-micron-thick PET film, which was used as a carrier substrate, on a web coater. The web speed, pump speed and heating zone temperature during coating were 4 ft/min, 16 ft/min and 70-114° C. respectively. At this temperature, the solvent evaporated from the release layer.

After drying, the resulting PVOH film had a strong adhesion to the PET carrier substrate and was easily broken during delamination. After the deposition of the copper and titanium layers on the PVOH film, and then the deposition of a lithium metal layer (as in Example 1), the anode release system could not be delaminated due to the high adhesion between PVOH and PET.

This comparative example illustrates that certain processes for forming release layers do not result in adequate release layers useful for fabricating an anode of an electrochemical cell. In this example, the release layer, which was formed by slowly dissolving hydrolyzed PVOH polymer in a water solution and then heating until 95° C., resulted in a layer having a relatively high adhesive affinity to the copper current collector and a relatively high adhesive affinity to the PET carrier substrate. As such, the release layer could not be delaminated from the PET substrate without mechanical disintegration.

Example 3

This example describes a process for forming a release layer, and a process for fabricating an anode of an electrochemical cell using the release layer.

In a 5 L flask equipped with a mechanical stirrer and a thermometer, 74.8 wt % distilled water was added and stirred at room temperature. To this solution was added 6.5% by weight of Celvol 425 PVOH (from Celanese Corp.) with continued stirring. The suspension was heated to a temperature between 90° C. and 95° C. until all PVOH pellets had dissolved completely. The solution was stirred continuously at this temperature for an additional hour. The stirring solution was allowed to cool to room temperature slowly under agitation. To this suspension was added 18.7 wt % IPA slowly under agitation. The cooled formulation was then filtered into a secondary container to remove any particulate contaminants. Once cooled, the PVOH solution was tested for percent solids, density, and viscosity. The resulting mixture was coated onto 76-micron-thick PET film on a Liberty Coater. The web speed, pump speed and heating zone temperature during coating were 6 ft/min, 16 ft/min and 70-114° C. respectively. At this temperature, the solvent evaporated from the release layer.

After coating, the PVOH release layer could be easily delaminated from the PET substrate without brakeage. The thickness of the released PVOH layer was 2 microns.

To fabricate an anode, a 2-micron-thick PVOH release layer was formed on the surface of a 100 ft sample of PET carrier substrate using the process described above. A current collector was formed by vacuum depositing copper and titanium on the release layer in an Alamo machine. A lithium metal layer was then deposited on top of the current collector. The combined thickness of the current collector and lithium metal layer was ~25 microns. The metalized anode release system was delaminated from the PET carrier substrate without brakeage, with the release layer remaining on the copper current collector. The resulting structure can be used as anode in a Li/S or other battery.

This example illustrates a method for fabricating an anode of an electrochemical cell by depositing a current collector and an electroactive material layer on a release layer positioned on a carrier substrate. The release layer, which was formed by dissolving hydrolyzed PVOH polymer in an water solution and then subsequently adding an alcohol solution, resulted in a layer having a relatively high adhesive affinity to the copper current collector and a relatively low adhesive affinity to the PET carrier substrate. As such, the release layer, along with the electrode assembly, could be easily delaminated from the PET substrate without mechanical disintegration.

Example 4

This example describes a process for forming a release layer, and a process for fabricating an anode of an electrochemical cell using the release layer.

In a 5 L flask equipped with a mechanical stirrer and a thermometer was added 72.2 wt % distilled water and stir at room temperature. To this solution, 9.8% by weight of PVOH was added with continued stirring. The suspension was heated between 90° C. to 95° C. until all PVOH pellets had dissolved completely. The suspension was stirred continuously for an additional hour at this temperature. The stirring solution was allowed to cool to room temperature slowly under agitation. To this suspension was added 18 wt % IPA slowly under agitation. The cooled formulation was then filtered into a secondary container to remove any particulate contaminants. Once cooled, the PVOH solution was tested for percent solids, density, and viscosity. The resulting mixture was coated onto a 76-micron-thick PET film, used as a carrier substrate, on a Liberty Coater. The web speed, pump speed and heating zone temperature during coating were 4 ft/min, 18 ft/min and 70-114° C. respectively. At this temperature, the solvent evaporated from the release layer.

After coating, the PVOH release layer could be easily delaminated from the PET substrate without brakeage. The thickness of the released PVOH layer was 2 microns.

To fabricate an anode, a 2-micron-thick PVOH release layer was formed on the surface of a 100 ft sample of PET carrier substrate using the process described above. A current collector was formed by vacuum depositing copper and titanium on the release layer in an Alamo machine. A lithium metal layer was then deposited on top of the current collector. The combined thickness of the current collector and lithium metal layer was ~25 microns. The metalized anode release system was delaminated from the PET carrier substrate without brakeage, with the release layer remaining on the copper current collector. The resulting structure can be used as anode in a Li/S or other battery.

This example illustrates a method for fabricating an anode of an electrochemical cell by depositing a current collector and an electroactive material layer on a release layer positioned on a carrier substrate. The release layer, which was formed by dissolving hydrolyzed PVOH polymer in an water solution and then subsequently adding an alcohol solution to the cooled water solution, resulted in a layer having a relatively high adhesive affinity to the copper current collector and a relatively low adhesive affinity to the PET carrier substrate. As such, the release layer, along with the electrode assembly, could be easily delaminated from the PET substrate without mechanical disintegration.

Example 5

This example describes a process for adhering two anode portions together through release layers associated with each of the anode portions to form an electrode assembly similar to that shown in FIG. 2B.

An adhesion promoter formulation was made by dissolving 0.1 g PVOH (Celvol 425 from Celanese Corp.) in a mixture of 2.9 g DMSO (dimethylsulfoxide) and 2 g THF (tetrahydrofuran). A thin layer of the adhesion promoter formulation (2 wt % polymer) was coated onto the release layer of a first anode portion formed by the process described in Example 1, which included a PVOH release layer, a copper current collector, and an lithium metal layer. Coating of the release layer with the adhesion promoter formulation was performed using a Mayer Rod Coater (#2.5, ChemInstruments, Inc.).

After coating the release layer of the first anode portion with the adhesion promoter layer, a second anode portion substantially similar to the first anode portion was positioned adjacent the adhesion promoter layer on the first anode portion. The two anode portions were laminated together under 2 kg/cm² compression with holding for 3 minutes. The coating was allowed to dry for additional 5 minutes at room temperature to allow the solvent in the adhesion promoter formulation to evaporate.

The coating of adhesion promoter was miscible with the release layers, and did not increase the thickness of electrode. The total thickness of the release layers from both anode portions and coating of adhesion promoter was about 5-6 microns as measured by cross-section view under an Amray 1845 Scanning Electron Microscope. After the coating, no corrosion, damages, or reactions on the surface of the lithium metal layer were observed.

The resulting anode assembly was used in a Li/S battery.

This example illustrates a method for fabricating an anode assembly of an electrochemical cell by adhering two anode portions together using an adhesion promoter formulation, which facilitates adhesion between the release layers associated with each of the anode portions. Advantageously, the adhesion promoter promoted strong adhesion between the PVOH release layers, was chemically inert to the various layers of the anode portions (e.g., the copper current collector and the lithium metal layer), could be coated easily, did not mechanically disintegrate upon coating and application of force, could be formed into a thin layer, and did not appreciably increase the thickness of the anode.

Comparative Example 3

In a 5 L 3-necked flask equipped with a mechanical stirrer, condenser, and a thermometer was added acetone (85% by weight), which was stirred at room temperature. To this solution was added 15% by weight of Hardman epoxy resins (Harcros Chemicals Inc.) with continued stirring. In a second 5 L 3-necked flask equipped with a mechanical stirrer, condenser, and a thermometer was added acetone (85% by weight), which was stirred at room temperature. To this second flask was added 15% by weight of Hardman amine hardener (Harcros Chemicals Inc.) with continued stirring. The contents from these two flasks were added together to form a mixture. After one hour of stirring of the resulting mixture, the resulting mixture was tested for percent solids, density, and viscosity. The resulting mixture was then filtered into a secondary container to remove any particulate contaminants. The resulting mixture containing the resins and hardener was used as an adhesion promoter and was coated onto the release layers of first and second anode portions formed by the process described in Example 1. Coating of the release layers with the adhesion promoter was performed using a Mayer Rod Coater (#2.5, ChemInstruments, Inc.). After each of the coatings, no corrosion, damages, or reactions on the surface of the lithium metal layer were observed.

After coating the release layers with the adhesion promoter, the first and second anode portions were positioned adjacent one another. The two anode portions were laminated together under 2 kg/cm² compression with holding for 3 minutes. The total thickness of the adhesion promoter layer alone was about 10 microns as measured by cross-section view under Amray 1845 Scanning Electron Microscope.

Example 6

This example describes a process for adhering two anode portions together through release layers associated with each of the anode portions to form an electrode assembly similar to that shown in FIG. 2B.

An adhesion promoter formulation was made by dissolving 0.1 g EVAL polymer (poly-co-ethylene(27%)-vinyl alcohol) (EVAL Americas) in a mixture of 2.9 g DMSO (dimethylsulfoxide) and 2 g THF (tetrahydrofuran). A thin layer of the adhesion promoter formulation (2 wt % polymer) was coated onto the release layer of a first anode portion formed by the process described in Example 1, which included a PVOH release layer, a copper current collector, and an lithium metal layer. Coating of the release layer with the adhesion promoter formulation was performed using a Mayer Rod Coater (#2.5, ChemInstruments, Inc.).

After coating the release layer of the first anode portion with the adhesion promoter layer, a second anode portion substantially similar to the first anode portion was positioned adjacent the adhesion promoter layer on the first anode portion. The two anode portions were laminated together under 2 kg/cm² compression with holding for 3 minutes. The coating was allowed to dry for additional 5 minutes at room temperature to allow the solvent in the adhesion promoter formulation to evaporate.

The coating of adhesion promoter was miscible with the release layers, and did not increase the thickness of electrode. The total thickness of the release layers from both anode portions and coating of adhesion promoter was about 5-6 microns as measured by cross-section view under an Amray 1845 Scanning Electron Microscope. After the coating, no corrosion, damages, or reactions on the surface of the lithium metal layer were observed.

The resulting anode assembly was used in a Li/S battery.

This example illustrates a method for fabricating an anode assembly of an electrochemical cell by adhering two anode portions together using an adhesion promoter formulation, which facilitates adhesion between the release layers associated with each of the anode portions. Advantageously, the adhesion promoter promoted strong adhesion between the PVOH release layers, was chemically inert to the various layers of the anode portions (e.g., the copper current collector and the lithium metal layer), could be coated easily, did not mechanically disintegrate upon coating and application of force, could be formed into a thin layer, and did not appreciably increase the thickness of the anode.

Comparative Example 4

In a 5 L 3-necked flask equipped with a mechanical stirrer, condenser, and a thermometer was added diethyl ether (40% by weight), which was stirred at room temperature. To this solution was added 20% by weight of Conductive Epoxy CW2400 resins (Chemtronics Inc.), with continued stirring. To this suspension was added 40% by weight distilled water. In a second 5 L 3-necked flask equipped with a mechanical stirrer, condenser, and a thermometer was added diethyl ether (40% by weight), which was stirred at room temperature. To this solution was added 20% by weight of Conductive Epoxy CW2400 hardener (Chemtronics Inc.), with continued stirring. To this suspension was added 40% by weight distilled water. The contents from the two flasks were added together to form a mixture. After one hour of stirring of the resulting mixture, the resulting mixture was tested for percent solids, density, and viscosity. The resulting mixture was then filtered into a secondary container to remove any particulate contaminants. The resulting mixture containing the resins and hardener was coated onto the release layers of first and second anode portions formed by the process described in Example 1. After coating, however, bubbles was observed on the anode portions, indicating that a chemical reaction occurred between the resulting adhesion promoter mixture with the metallic lithium.

Comparative Example 5

In a 5 L 3-necked flask equipped with a mechanical stirrer, condenser, and a thermometer was added acetone (80.75% by weight), which was stirred at room temperature. To this solution was added 15% by weight of Hardman epoxy resins (Harcros Chemicals Inc.) with continued stirring. To this suspension was added 4.25% distilled water. In a second 5 L 3-necked flask equipped with a mechanical stirrer, condenser, and a thermometer was added acetone (80.75% by weight), which was stirred at room temperature. To this second flask was added 15% by weight of Hardman amine hardener (Harcros Chemicals Inc.) with continued stirring. To this suspension was added 4.25% distilled water. The contents from the two flasks were added together to form a mixture. After one hour of stirring of the resulting mixture, the resulting mixture was tested for percent solids, density, and viscosity. The resulting mixture was then filtered into a secondary container to remove any particulate contaminants. The resulting mixture containing the resins and hardener was used as an adhesion promoter and was coated onto the release layer of the first anode portion formed by the process described in Example 1. Coating of the release layer with the adhesion promoter was performed by spraying the solution through nozzles. After each of the coatings, no corrosion, damages, or reactions on the surface of the lithium metal layer were observed.

After coating the release layer of the first anode portion with the adhesion promoter layer, a second anode portion substantially similar to the first anode portion was positioned adjacent the adhesion promoter layer of the first anode portion. The two anode portions were laminated together under 2 kg/cm² compression with holding for 3 minutes. The total thickness of the adhesion promoter layer alone was about 10 microns as measured by cross-section view under Amray 1845 Scanning Electron Microscope.

Example 7

This example describes a process for adhering two anode portions together through release layers associated with each of the anode portions to form an electrode assembly similar to that shown in FIG. 2B.

An adhesion promoter formulation was made by mixing 1.0 g DMSO (dimethylsulfoxide) and 4.0 g THF (tetrahydrofuran). The adhesion promoter formulation, which did not include any polymer, was coated onto the release layer of a first anode portion formed by the process described in Example 1, which included a PVOH release layer, a copper current collector, and an lithium metal layer. Coating of the release layer with the adhesion promoter formulation was performed using a Mayer Rod Coater (#2.5, ChemInstruments, Inc.).

After coating the release layer of the first anode portion with the adhesion promoter layer, a second anode portion substantially similar to the first anode portion was positioned adjacent the adhesion promoter layer on the first anode portion. The two anode portions were laminated together under 2 kg/cm² compression with holding for 3 minutes. The coating was allowed to dry for additional 5 minutes at room temperature to allow the solvent in the adhesion promoter formulation to evaporate.

The coating of the adhesion promoter allowed adhesion of the release layers from the two anode portions without increasing the thickness of electrode. The total thickness of the release layers from both anode portions and coating of adhesion promoter was about 5-6 microns as measured by cross-section view under an Amray 1845 Scanning Electron Microscope. After the coating, no corrosion, damages, or reactions on the surface of the lithium metal layer were observed.

The resulting anode assembly was used in a Li/S battery.

This example illustrates a method for fabricating an anode assembly of an electrochemical cell by adhering two anode portions together using an adhesion promoter formulation, which facilitates adhesion between the release layers associated with each of the anode portions. Advantageously, the adhesion promoter promoted strong adhesion between the PVOH release layers, was chemically inert to the various layers of the anode portions (e.g., the copper current collector and the lithium metal layer), could be coated easily, did not mechanically disintegrate upon coating and application of force, could be formed into a thin layer, and did not appreciably increase the thickness of the anode.

Example 8

This example describes a process for adhering two anode portions together through release layers associated with each of the anode portions to form an electrode assembly similar to that shown in FIG. 2B. This example also shows that the resulting electrode assembly was compatible with an electrolyte comprising dimethoxyethane and 1,3-dioxolane.

An adhesion promoter formulation was made by mixing 0.5 g DMSO (dimethylsulfoxide) and 4.0 g THF (tetrahydrofuran). The adhesion promoter formulation, which did not include any polymer, was coated onto the release layer of a first anode portion formed by the process described in Example 1, which included a PVOH release layer, a copper current collector, and an lithium metal layer. Coating of the release layer with the adhesion promoter formulation was performed using a Mayer Rod Coater (#2.5, ChemInstruments, Inc.).

After coating the release layer of the first anode portion with the adhesion promoter layer, a second anode portion substantially similar to the first anode portion was positioned adjacent the adhesion promoter layer on the first anode portion. The two anode portions were laminated together under 2 kg/cm$^2$ compression with holding for 3 minutes. The coating was allowed to dry for additional 5 minutes at room temperature to allow the solvent in the adhesion promoter formulation to evaporate.

The coating of the adhesion promoter allowed adhesion of the release layers from the two anode portions without increasing the thickness of electrode. The total thickness of the release layers from both anode portions and coating of adhesion promoter was about 5-6 microns as measured by cross-section view under an Amray 1845 Scanning Electron Microscope. After the coating, no corrosion, damages, or reactions on the surface of the lithium metal layer were observed.

The resulting anode assembly was cut into 2 cm×2 cm pieces, and soaked in 10 mL of electrolyte, which included 8% LiTFSI, 4% LiNO$_3$%, 44% dimethoxyethane and 44% 1,3-dioxolane. The reactivity of the pieces to the electrolyte was monitored over the period of 7 days. The electrolyte was clear and colorless at the time of addition of the pieces. After the 7th day, the electrolyte was still clear and colorless and the pieces of anode assembly remained intact. The two anode portions that were laminated together using the adhesion promoter could not be pulled apart.

This example illustrates a method for fabricating an anode assembly of an electrochemical cell by adhering two anode portions together using an adhesion promoter formulation, which facilitates adhesion between the release layers associated with each of the anode portions. This example also shows that the two anode portions did not delaminate after lamination and being soaked in an electrolyte for 7 days, and that the electrolyte did not penetrate between the two release layers of the anode portions.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A final electrochemical cell comprising:
   a first anode;
   a second anode;
   an electrolyte;
   a cathode; and
   a release layer having an adhesive affinity to at least one component of the electrochemical cell greater than its adhesive affinity to a substrate on which at least a portion of the electrochemical cell was fabricated, wherein the release layer comprises a polymeric material including pendant hydroxyl functional groups, and wherein the release layer is positioned between the first and second anodes and adheres together the first and second anodes.

2. A final electrochemical cell as in claim 1, wherein the polymeric material is greater than 80% hydrolyzed.

3. A final electrochemical cell as in claim 1, wherein the release layer comprises poly(vinyl alcohol).

4. A final electrochemical cell as in claim 1, wherein the release layer has a thickness of between 0.01 and 10 microns.

5. A final electrochemical cell as in claim 1, wherein the release layer has a thickness of about 5 microns or less.

6. A final electrochemical cell as in claim 1, wherein the release layer comprises a surfactant.

7. A final electrochemical cell as in claim 1, wherein at least 80 wt % of the release layer is a non-UV curable material.

8. A final electrochemical cell as in claim 1, wherein the first anode comprises a current collector and an electroactive material layer.

9. A final electrochemical cell as in claim 8, wherein the current collector is positioned between the electroactive layer and the release layer.

10. A final electrochemical cell as in claim 9, wherein the current collector is positioned immediately adjacent the release layer, and the electroactive material layer is positioned immediately adjacent the current collector.

11. A final electrochemical cell as in claim 8, wherein the current collector has a thickness of about 12 microns or less.

12. A final electrochemical cell as in claim 8, wherein the current collector has a thickness of about 3 microns or less.

13. A final electrochemical cell as in claim 8, wherein the current collector has a thickness of about 1 micron or less.

14. A final electrochemical cell as in claim 8, wherein the current collector has a thickness of between 0.1-0.5 microns.

15. A final electrochemical cell as in claim 14, wherein the release layer has a thickness of between 1-5 microns.

16. A final electrochemical cell as in claim 15, wherein the release layer comprises poly(vinyl alcohol).

17. A final electrochemical cell as in claim 16, wherein the poly(vinyl alcohol) is greater than 80% hydrolyzed.

18. A final electrochemical cell as in claim 8, wherein the electroactive material layer comprises lithium.

19. A final electrochemical cell as in claim 8, wherein the electroactive material layer comprises lithium metal.

20. A final electrochemical cell as in claim 8, wherein the electroactive material layer has a thickness of greater than about 5 microns.

21. A final electrochemical cell as in claim 1, wherein the electrochemical cell is constructed and arranged to apply, during at least one period of time during charge and/or discharge of the electrochemical cell, an anisotropic force with a component normal to a surface of the electrode, wherein the component defines a pressure of at least about 98 Newtons per square cm, and wherein the release layer is configured to withstand the application of force during cycling of the cell.

22. A final electrochemical cell as in claim 1, wherein the polymeric material is greater than 90% hydrolyzed.

23. A final electrochemical cell as in claim 1, wherein the polymeric material comprises a vinyl acetate-vinyl alcohol copolymer.

* * * * *